(12) United States Patent
Fecher et al.

(10) Patent No.: US 12,251,277 B2
(45) Date of Patent: Mar. 18, 2025

(54) METHOD FOR PRODUCING A MULTI-LAYER BLANK WITH A THROUGH-HOLE

(71) Applicant: DENTSPLY SIRONA INC., York, PA (US)

(72) Inventors: Stefan Fecher, Johannesberg (DE); Lothar Völkl, Goldbach (DE); Sven Giese, Hanau (DE); Tobias Rösch, Reichenberg (DE); Andreas Gebhardt, Langenselbold (DE)

(73) Assignee: Dentsply Sirona Inc., York, PA (US)

( * ) Notice: Subject to any disclaimer, the term of this patent is extended or adjusted under 35 U.S.C. 154(b) by 630 days.

(21) Appl. No.: 17/592,677

(22) Filed: Feb. 4, 2022

(65) Prior Publication Data
US 2023/0249379 A1 Aug. 10, 2023

(51) Int. Cl.
*A61C 13/00* (2006.01)
*A61C 13/20* (2006.01)
(Continued)

(52) U.S. Cl.
CPC .......... *A61C 13/0022* (2013.01); *A61C 13/20* (2013.01); *B28B 3/02* (2013.01); *B28B 3/021* (2013.01); *B28B 3/08* (2013.01); *B30B 11/027* (2013.01); *B30B 15/022* (2013.01); *A61C 13/09* (2013.01); *A61C 13/225* (2013.01); *B22F 3/03* (2013.01); *B22F 2003/031* (2013.01); *B28B 11/243* (2013.01)

(58) Field of Classification Search
CPC ....... B30B 15/022; B30B 11/027; B22F 3/03; B22F 2003/031; B28B 3/08; B28B 3/021; B28B 3/02; A61C 13/225; A61C 13/20; A61C 13/081
See application file for complete search history.

(56) References Cited

U.S. PATENT DOCUMENTS 2,249,890 A * 7/1941 Droge ................. B28B 3/02
264/20
4,419,413 A * 12/1983 Ebihara ............. B30B 11/027
164/412
(Continued)

*Primary Examiner* — Benjamin A Schiffman
(74) *Attorney, Agent, or Firm* — SCHWEGMAN LUNDBERG & WOESSNER, P.A.

(57) ABSTRACT

A method for forming a multi-layer blank of a ceramic material including the steps of: providing a mold that includes at least one side wall surrounding a lower press plunger to form a cavity therebetween, wherein the lower press plunger has a movable pin; filling into the mold a first ceramic material; extending the movable pin from an upper surface of the lower press plunger and into the cavity; pressing a first upper press plunger against the first ceramic material so that a first open cavity is formed while at least a portion of the first upper press plunger is in contact with the movable pin to maintain the through-hole through the first layer; filling into the mold a second ceramic material of a different composition; extending the movable pin from an upper surface of the first layer and into the first open cavity; and pressing a second upper press plunger against the second layer so that a second open cavity is formed in communication with the through-hole that extends through the first and second layers to form the blank.

20 Claims, 18 Drawing Sheets

(51) Int. Cl.
*B28B 3/02* (2006.01)
*B28B 3/08* (2006.01)
*B30B 11/02* (2006.01)
*B30B 15/02* (2006.01)
*A61C 13/09* (2006.01)
*A61C 13/225* (2006.01)
*B22F 3/03* (2006.01)
*B28B 11/24* (2006.01)

(56) References Cited

U.S. PATENT DOCUMENTS

| | | | | |
|---|---|---|---|---|
| 5,498,147 | A * | 3/1996 | Katagiri | B22F 3/03 419/68 |
| 6,004,120 | A * | 12/1999 | Matsubara | B22F 5/10 425/355 |
| 6,531,090 | B2 * | 3/2003 | Ogawa | B30B 11/02 419/38 |
| 6,871,524 | B2 * | 3/2005 | Olsson | B30B 15/026 72/355.6 |
| 7,368,075 | B2 * | 5/2008 | Olsson | B30B 11/08 264/109 |
| 7,560,068 | B2 * | 7/2009 | Smilovici | B23C 5/202 419/10 |
| 8,137,095 | B2 * | 3/2012 | Liu | B30B 11/027 425/468 |
| 8,616,866 | B2 * | 12/2013 | Satran | C04B 35/64 425/DIG. 58 |
| 9,132,480 | B2 * | 9/2015 | Cripps | B22F 3/03 |
| 10,480,619 | B2 * | 11/2019 | Ta | F16H 57/08 |
| 10,485,640 | B2 * | 11/2019 | Volkl | C04B 37/001 |
| 10,532,404 | B2 * | 1/2020 | Sanada | B22F 3/004 |
| 11,090,142 | B2 * | 8/2021 | Volkl | A61C 13/09 |
| 11,446,737 | B2 * | 9/2022 | Maruyama | B30B 11/027 |
| 11,666,966 | B2 * | 6/2023 | Ohno | B30B 11/007 419/38 |
| 11,833,003 | B2 * | 12/2023 | Vollmann | A61C 13/082 |
| 12,103,082 | B2 * | 10/2024 | Morita | B30B 15/022 |
| 2011/0318411 | A1 * | 12/2011 | Luber | B29C 43/146 514/648 |
| 2013/0252012 | A1 * | 9/2013 | Cooper | B22F 3/03 419/66 |
| 2015/0118511 | A1 * | 4/2015 | Hasegawa | B22F 1/105 428/548 |

* cited by examiner

METHOD FOR PRODUCING A MULTI-LAYER BLANK WITH A THROUGH-HOLE

TECHNICAL FIELD

The invention relates, inter alia, to a method for the preparation of a multi-layer blank of a ceramic material, in particular a blank to be used for the preparation of a dental restoration, wherein a first ceramic material and then a second ceramic material of different compositions are filled into a die with a through-hole provided therein and wherein the materials are pressed and optionally sintered.

The invention also relates to a pre-sintered or fully-sintered blank to be used for the preparation of a dental restoration with a preformed screw-hole, such as a dental framework, crown, partial crown, cap, abutment (e.g., a two-piece abutment), Ti-base (or an adapter for a Ti-base) and/or otherwise in particular a crown or partial crown, comprising a ceramic material which in particular contains zirconium dioxide and has regions of different compositions and a through-hole provided therethrough.

BACKGROUND OF THE INVENTION

U.S. Pat. No. 8,936,848 B2 discloses a blank of zirconium dioxide that is used for the preparation of a tooth replacement and comprises a number of layers of different chemical compositions. The individual layers thereby have different percentages of yttrium oxide.

A body of zirconium dioxide exhibits a decrease or increase in chromacity along a straight line in the L*a*b* color space (US 2014/0328746 A1).

A blank of zirconium dioxide for the preparation of dental objects in accordance with WO 2014/062375 A1 has at least two material regions which have different percentages of tetragonal and cubic crystal phases, wherein in one of the regions the quotient is greater than 1 and in the other region the quotient is lower than 1.

EP 2 371 344 A1 relates to a ceramic body which is enriched with a stabilizing agent from the surface to a desired depth.

Zirconium dioxide is used as a ceramic material to produce dental restorations. A framework can be milled, for example, from a blank of zirconium dioxide and can then be sintered. In the following processing stages, a veneer is applied manually to the framework, wherein at least one incisor material is applied and fused. All of these process measures are time-consuming and moreover do not ensure that the dental restoration will meet the requirements.

SUMMARY OF THE INVENTION

It is an object of the present invention to develop a method of the aforementioned type in such a way that the disadvantages of the prior art are avoided and in particular that a dental restoration can be produced from a ceramic material without laborious finishing while reducing some additional post-processing steps, which satisfies aesthetic requirements and moreover is of high strength in regions under severe loads while simplifying the attachment of the dental restoration within patient's mouth.

To achieve this aim it is proposed, inter alia, that a layer of a first ceramic material is filled into the die and around a movable pin wherein a first (or only) layer may be formed having a through-hole extend therethrough. Wherein one or more additional layers may be desired, a first open cavity may be formed along an exposed surface of the first layer of the first ceramic material. A second ceramic material is filled into the first open cavity and around the movable pin so that the through-hole may be maintained through both the first and second material (e.g., the first and second layers) while the materials are pressed together and optionally heat-treated.

According to the invention, a layer of pourable material is first filled into a die in which a movable pin has been extended into a cavity of the die. This material may, for example, be shaded like the incisal of a natural tooth by having zirconium dioxide granular material that has a bulk density between 1 g/cm$^3$ and 1.4 g/cm$^3$, in particular in the region between 1.15 g/cm$^3$ and 1.35 g/cm$^3$. Following filling of the granular material, which preferably has a grain size D50 between 40 μm and 70 μm, a through-hole through the material and an open cavity along an exposed surface of the material is formed, for example by means of a press plunger. This is carried out, for example, by expelling parts of the first ceramic material and/or lightly compacting them while the movable pin retracts. Thus, in the so-formed recess or cavity, which in particular has a substantially conus-like geometry, the movable pin is extended therein to be surrounded by the second ceramic material while filling the cavity in preparation for the materials to be pressed together. Optionally, the pressed first and second material (e.g., pressed ceramic blank) may be partially or fully/finally heat-treated. The partial and/or full heat-treatment may occur while the pressed material remains in the die/mold or after being removed therefrom. It is appreciated that if a crown or partial crown or cap is to be produced from the blank, the through-hole may be generally aligned with the conus-like shaped recess or cavity, which may also be generally aligned with the geometry of a tooth stump, an abutment or a Ti-base.

There is also the possibility of forming one or more further layers such that a second open cavity may be provided in the second ceramic material that fills the first open cavity. Similarly, the movable pin is extended into the second cavity to be surrounded by a third ceramic material that will eventually fill the second cavity while maintaining the through-hole. This step can accompany the concomitant pressing of all materials.

Compaction of the materials takes place independently thereof.

Compression may be carried out at a pressure preferably between 2 bar and 20,000 bar. Preferably, the compression of forming the one or more internal layers may be carried out at a pressure ranging from 2 bar to 100 bar (e.g., 5 bar to 50 bar) while the final compression of the block (e.g., all layers) may be carried out at a pressure ranging from 500 bar to 20,000 bar (e.g., 1000 bar to 10,000 bar). A density of approximately 3 g/cm$^3$ may be attained.

Debinding and pre-sintering of the pressed ceramic blank at a temperature between 700° C. and 1100° C. may be then carried out, in particular in a range between 850° C. and 1050° C., over a time between 100 minutes and 150 minutes.

The debinding and pre-sintering may be carried out in such a way that a bending strength between 10 MPa and 60 MPa, in particular between 15 MPa and 45 MPa is achieved, measured in accordance with ISO 6872.

Where a second open cavity is formed in the second ceramic material and a third ceramic material is filled into it, then this composition may differ from that of the second ceramic material, in particular in having a lower translucence and/or a higher bending strength than the second/first material.

In particular, according to the invention a movable pin may be provided in one or more press tools of the die. The movable pin may be extended into (e.g., through) a number of first open cavities that may be provided in various layers of the first ceramic material and the second ceramic material to form and/or maintain a through-hole. This yields a number of distinct, separated blank sections, so-called nests, so that after the pre-sintering a number of dental restorations can be derived from the sections of such a blank, in particular through milling and/or grinding wherein the dental restorations have screw-holes (e.g., through-holes) that were pre-formed in the blank prior to any milling and/or grinding of such blank. Thereby it is possible for the dimensions of the blank sections to differ from one another to derive restorations of different geometries which can also differ in the geometric arrangement of the respective root-side/dentine-side material regions. It is therefore possible to obtain teeth of different shapes from one blank, according to the number of nests/blank sections and their geometries while simplifying/reducing the post processing steps of the blank and/or aiding in the attachment of the dental restoration with the preformed screw hole. As already mentioned, it is appreciated that the dentine cores may be formed from the second regions (e.g., second and additional layers/materials) and the incisors from the first region (e.g., first layer/material), though not required.

The invention in particular provides for the thermal expansion coefficient of the second ceramic material to be 0.2 μm/m*K to 0.8 μm/m*K higher than the thermal expansion coefficient of the first ceramic material. As a result of the different thermal expansion coefficients of the materials, a compressive stress is created in the first material i.e. in the incisor material which leads to an increase in strength of the dental restoration derived from the blank.

Furthermore, there is the possibility of coloring the ceramic materials to the desired extent, in particular such that for the first region an incisor material is used which is more translucent and less colored compared to the second ceramic material.

If a dental restoration or other molded body with a screw hole is preferably derived from the pre-sintered blank with a through-hole, then there is naturally also the possibility that the blank with the through-hole is first partially-sintered or fully-sintered and then further processed to form the molded body, in particular by milling or grinding.

Independently of when the blank with the through-hole is sintered through, it is provided in particular for the complete (or full) sintering to be carried out over a period of between 10 minutes and 250 minutes at a temperature in the range between 1300° C. and 1600° C. Sintering may also be carried out at a slightly higher temperature.

If sintering is performed at a temperature which, for example, is 100° C. above the temperature given by the manufacturer of the starting material, and above the time recommended by the manufacturer for the complete or full sintering, this is referred to as over-sintering.

The present values apply in particular when the starting material substantially contains zirconium dioxide, in particular more than 80 wt %.

Yttrium oxide, in particular may be added to the zirconium dioxide, but calcium oxide, magnesium oxide and/or cerium oxide may also be added.

If the ceramic material is colored, then in particular a color-imparting oxide from elements selected from the group Pr, Er, Tb, Fe, Co, Ni, Ti, V, Cr, Cu, and Mn, preferably Tb2O3, $Fe_2O_3$, $Er_2O_3$, $Co_3O_4$ and/or mixtures thereof may be used.

The invention is therefore also characterized by the fact that the ceramic materials used contain zirconium dioxide to which may be added yttrium oxide ($Y_2O_3$), calcium oxide (CaO), magnesium oxide (MgO) and/or cerium oxide ($CeO_2$), in particular yttrium oxide, wherein the first ceramic material differs from the material of the second ceramic material in terms of color and/or crystal forms stabilized at room temperature.

Further, it is provided for the first and/or second ceramic material to be such that the percentage of yttrium oxide in the second material is in the range 4.5 wt % to 9.5 wt % and/or the percentage in the first material is in the range 4.5 wt % to 10.5 wt %, wherein the percentage of yttrium oxide in the first ceramic material may be equal to or higher than that in the second material.

The materials of the first and also the second region may thereby be selected such that the quotient of the tetragonal crystal phase to the cubic crystal phase of zirconium dioxide of both regions after pre-sintering is ≥1.

The following composition in wt % is preferred as the basic material for the first and second ceramic material:

| | | |
|---|---|---|
| $HfO_2$ | | <3.0 |
| $Al_2O_3$ | | <0.3 |
| Technically caused, unavoidable components ≤ 0.2 (e.g., $SiO_2$, $Fe_2O_3$, $Na_2O$) | | |
| For the first layer: | $Y_2O_3$ | 4.5 to 10.5 |
| For the second layer: | $Y_2O_3$ | 4.5 to 9.5 |
| Coloring oxides: | | 0-1.5 |
| $ZrO_2$ = 100 − ($Y_2O_3$ + $Al_2O_3$ + $HfO_2$ + unavoidable components + color-imparting oxides) | | |

It is also possible for additional binding agents to be added. This is not taken into account in the above statement of percentage by weight.

According to the teaching of the invention, after full sintering a monolithic dental restoration with a screw-hole is obtained, which in principle does not have to be veneered, but if so then there is no departure from the invention.

A pre-sintered or fully sintered blank with a through-hole for use in producing a dental restoration with a screw-hole such as a dental framework, crown, partial crown, cap, abutment (e.g., two-piece abutment), Ti-base, in particular crown or partial crown, each have a screw-hole extending therethrough, include a ceramic material, which in particular contains zirconium dioxide and regions of different compositions, wherein a first region is of a first ceramic material and at least one second region is of a second ceramic material and the regions are adjacent to each other, is characterized by the fact that a through-hole extends through at least one second region, which extends within the first region such that the first region has an outer geometry that tapers from a basal region. Thereby, the through-hole extending through the basal region, which may extend in the region of an outer surface of the first region, and preferably merge with it so that the through-hole extends through both regions.

It is also possible for the second region extending from the basal region to have a cavity.

Independently of this, the second region in its outer geometry may have a cones-like extending geometry.

There is also the possibility that a third region extends within the second region, said third region consisting of a third ceramic material of a composition which deviates and/or is different from that of the second ceramic material.

It is to be emphasized and in accordance with this invention that a number of second regions may be surrounded by the first region, in particular some of the plurality of second regions differ in their external geometries wherein the through-hole preferably extends through each of the regions.

Thus, for example, crowns or artificial teeth of different geometries having a screw-hole can be produced having a higher strength in the dentine than in the incisal region. For this purpose, upon derivation of the dental restoration with a screw-hole from the blank having a through-hole, the dentine is formed in the region of sections of the second region and the incisal region is formed from sections of the first region of the blank while the through-hole extends through the various regions.

The invention may be further characterized in that the blank may include zirconium dioxide to which yttrium oxide has been added, that the percentage of yttrium oxide in the second or third ceramic material lies between 4.5 wt % and 9.5 wt % and in the first ceramic material lies between 4.5 wt % and 10.5 wt %, wherein the percentage of yttrium oxide in the first ceramic material may be equal to or greater than in the second ceramic material.

Wherein the percentage of yttrium oxide in the first ceramic material is greater than in the second ceramic material, the lower yttrium content in the material of the second region may result in a higher strength in comparison to that of the first region.

Furthermore, there is the possibility that the ceramic material of the second region is colored and that of the first region is colored to a lesser degree or not at all, so that a higher translucency than in the second region results.

A dental restoration having a preformed screw-hole, in particular tooth, crown or partial crown or cap, each having a preformed screw-hole, is characterized by comprising a through-hole extending through a first and second layer wherein the first layer of a first material which extends on the incisal side and the root side-extending second layer consisting of a second ceramic material, in that the first layer has a higher translucency and/or a lower strength than the second layer and that the first layer has a thermal expansion coefficient of about 0.2 µm/m*K to 0.8 µm/m*K lower than that of the second layer.

The present invention is directed to dental devices, and methods of manufacturing the dental devices. In one aspect, the present disclosure provides for a method for forming a multi-layer blank of a ceramic material comprising the steps of: providing a mold that includes at least one side wall surrounding a lower press plunger to form a cavity therebetween, wherein the lower press plunger has a movable pin; filling into the mold a first ceramic material, wherein the first ceramic material is filled in a pourable condition into the mold to form a first layer: extending the movable pin from an upper surface of the lower press plunger and into the cavity either prior to, during, or after filling the mold with the first ceramic material to form the first layer, wherein once the movable pin is at least partially extended into the cavity and the first layer is formed, at least a portion of the movable pin extends through the first layer thereby being surrounded by the first ceramic material to form a through-hole through the first layer; pressing a first upper press plunger against the first layer so that a first open cavity is formed while at least a portion of the first upper press plunger is in contact with the movable pin to maintain the through-hole through the first layer; filling into the mold a second ceramic material of a different composition, wherein the second ceramic material is filled in a pourable condition into the first open cavity to form a second layer; extending the movable pin from an upper surface of the first layer and into the first open cavity either prior to, during, or after filling the mold with the second ceramic material to form the second layer, wherein once the movable pin is at least partially extended into the first open cavity and the second layer is formed, at least a portion of the movable pin extends through the second layer thereby being surrounded by the second ceramic material to extend the through-hole through the second layer; pressing a second upper press plunger against the second layer so that a second open cavity is formed in communication with the through-hole that extends through the first and second layers to form the blank.

In another aspect, the present disclosure provides for a method for forming a multi-layer blank of a ceramic material comprising the steps of: providing a mold that includes at least one side wall surrounding a lower press plunger to form a cavity therebetween, wherein the lower press plunger has a movable pin: extending the movable pin from an upper surface of the lower press plunger and into the cavity; filling into the mold a first ceramic material, wherein the first ceramic material is filled in a pourable condition into the mold and around the movable pin to form a first layer with a through-hole; pressing a first upper press plunger against the first layer so that a first open cavity is formed while at least a portion of the first upper press plunger is in contact with the movable pin to maintain the through-hole in the first layer; extending the movable pin into the first open cavity; filling into the mold a second ceramic material of different composition than the first ceramic material, wherein the second ceramic material is filled in a pourable condition into the first open cavity and around the movable pin to form a second layer while maintaining the through-hole in both the first and second layers; pressing a second upper press plunger against the second layer so that a second open cavity is formed in communication with the through-hole that extends through the first and second layers, wherein the second open cavity and the through-hole define a screw-hole of the blank, the screw hole having a generally cylindrical lower portion and an upper portion having a shaped portion (e.g., an abutment or Ti-Base connection/mating portion) with an anti-rotation feature.

In another aspect, the present disclosure provides for a method for forming a multi-layer blank of a ceramic material comprising the steps of: providing a mold that includes at least one side wall surrounding a lower press plunger to form a cavity therebetween, wherein the lower press plunger has a movable pin; extending the movable pin from an upper surface of the lower press plunger and into the cavity; filling into the mold a first ceramic material, wherein the first ceramic material is filled in a pourable condition into the mold and around the movable pin to form a first layer with a through-hole; pressing a first upper press plunger against the first layer and an upper portion of the movable pin so that a first open cavity is formed while at least a portion of the first upper press plunger is in contact with the upper portion of the movable pin to maintain the through-hole in the first layer; wherein while the first ceramic material of the first layer is being compacted by the first upper press plunger, the movable pin is partially retracted into the lower press plunger by the pressing movement of the first upper press plunger; removing the first upper press plunger to expose at least a portion of the formed first open cavity; extending the movable pin into the first open cavity; filling into the mold a second ceramic material of different composition than the first ceramic material, wherein the second ceramic material is filled in a pourable condition into the first open cavity and around the movable pin to form a second layer while maintaining the through-hole in both the first and second layers: pressing a second upper press plunger against the second layer and the upper portion of the movable pin so that a second open cavity is formed in communication with the through-hole that extends through the first and second layers to form the blank; wherein as the second upper press plunger presses against the second layer and the upper portion of the movable pin, the first and second ceramic materials are compressed while at least a portion of the movable pin is retracted into the lower press plunger by the pressing movement of the second upper press plunger.

In yet another aspect, any of the aspects of the present invention may be further characterized by one or any combination of the following features: wherein the lower press plunger is movable and assists in the pressing of the first layer, the second layer, or both: wherein at least a portion of the upper press plunger is in contact with the movable pin to maintain the through-hole extending through the first and second layers; wherein the movable pin is generally cylindrically shaped with a tapered free end that contacts a lower end portion of the first upper press plunger or the second upper press plunger during the respective pressing step to assist in maintaining the through-hole through the respective first layer or first and second layers; wherein an upper end portion of the movable pin remains in contact with the first upper press plunger or the second upper press plunger during the respective pressing step to assist in maintaining the through-hole through each layer; wherein the second upper press plunger includes a lower portion that is pressed into at least a portion of the second ceramic material to define at least a portion of the second open cavity, and wherein the lower portion of the second upper press plunger includes an upper seat portion that has a shape, which imparts an anti-rotation feature along a surface of the through-hole of the blank; wherein an upper end portion of the movable pin has a corresponding shape with a distal end of the lower portion of the second upper press plunger, which are in communication with one another during the pressing step to assist in maintaining the through-hole extending through the first and second layers; wherein the second upper press plunger includes a lower portion that is pressed into at least a portion of the second ceramic material to define at least a portion of the second open cavity, and wherein the lower portion of the second upper press plunger has a shape that imparts an upper conical portion and a lower cylindrical end portion along the surface of the through-hole of the blank; wherein the upper conical portion of the through-hole of the blank defines a seat portion for receiving an attachment device for securing a restoration formed from the blank to an abutment and wherein the seat portion includes an anti-rotation feature for preventing rotation of the attachment device; wherein the upper portion of the movable pin has a corresponding shape with the lower cylindrical portion of the first upper press plunger or the second upper press plunger to assist in maintaining the through-hole extending through the first and second layers; the step of partially or fully sintering the blank; the steps of: (i) extending the movable pin into the second open cavity; (ii) filling into the mold a third ceramic material of a different composition than the second ceramic material, wherein the third ceramic material is filled in a pourable condition into the second open cavity and around the movable pin to form a third layer while maintaining the through-hole in the first, second, and third layers; (iii) pressing a third upper press plunger against the third layer so that a third open cavity is formed in communication with the through-hole that extends through the first, second, and third layers to form the blank, wherein the third upper press plunger includes a lower portion that is pressed into at least a portion of the third ceramic material to define at least a portion of the third open cavity, and wherein the lower portion of the third upper press plunger in communication with the movable pin imparts a shape to the through-hole of the blank that generally defines an upper conical portion and a lower cylindrical end portion; wherein the upper conical portion of the through-hole of the blank defines a seat portion for receiving an attachment device for securing a restoration formed from the blank to an abutment and wherein the seat portion includes an anti-rotation feature for preventing rotation of the attachment device; wherein the second upper press plunger includes a lower portion that is pressed into at least a portion of the second ceramic material to define at least a portion of the second open cavity, and wherein the lower portion of the second upper press plunger in communication with the movable pin imparts a shape to the through-hole of the blank that generally defines an upper conical portion and a lower cylindrical end portion: wherein the upper conical portion of the through-hole of the blank defines a seat portion for receiving an attachment device for securing a restoration formed from the blank to an abutment and wherein the seat portion includes an anti-rotation feature for preventing rotation of the attachment device, or any combination thereof.

It should be appreciated that the above referenced aspects and examples are non-limiting as others exist with the present invention, as shown and described herein. For example, any of the above mentioned aspects or features of the invention may be combined to form other unique configurations, as described herein, demonstrated in the drawings, or otherwise.

Further details, advantages and features of the invention result not only from the claims and the features disclosed therein alone and/or in combination but also from the following description of the example embodiments shown in the drawings.

DETAILED DESCRIPTION OF THE INVENTION

Figure 1A:
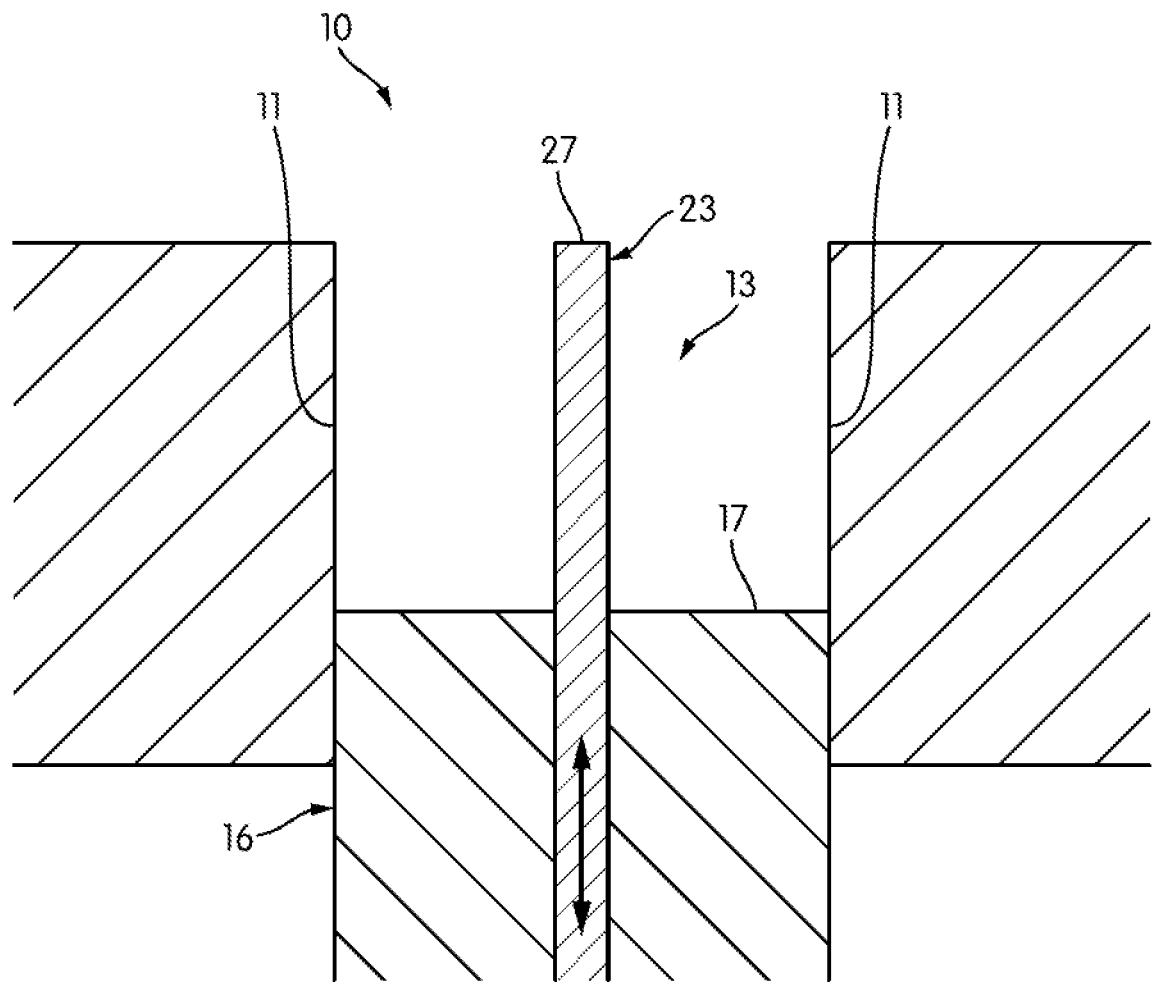
FIG. 1A is a cross-sectional view of a device according to the method of the present invention performed using the device.

The teaching of the invention is illustrated by reference to the figures, in which the same elements are basically given the same reference numerals, wherein in particular dental restorations are produced from a ceramic material having a monolithic structure such that after complete sintering an immediately usable monolithic tooth replacement is available.

To this end, the invention provides for the preparation of a blank, which has regions of ceramic material with differing compositions and thus properties, has desired optical and mechanical properties according to the restoration to be produced, which, as mentioned, offer the possibility of immediate usage of the tooth replacement monolithically fabricated after full sintering without, for example, having to apply incisor material by hand.

Further, specifically desired strength values are attainable in the ranges in which high loads occur. Desired optical properties can be achieved.

With reference to Figures, the manufacture of a blank will be described from which a dental restoration can be produced, in the example embodiment, a crown or abutment crown (e.g., for attachment to an abutment or Ti-base).

The method comprises the steps of providing a die (mold) 10 having at least one wall 11 surrounding a pressing tool to define an open cavity therein. The pressing tool may include one or more moveable press tools (plungers) and optionally one or more stationary press tools. It is appreciated that the one or more movable press tools may be movable along the at least one wall and/or relative to an opposing movable press tool or stationary press tool (when included). In one specific example, the pressing tool may include at least one lower press tool and at least one upper press tool so that at least one of the lower and upper press tools is movable. Preferably, though not required, the pressing tool may include at least one movable lower press tool (plunger) and at least one movable upper press tool (plunger) that are configured to operatively move independently (if necessary) of each other.

The pressing tool may further include at least one movable pin 23 that may be independently movable Land/or pressing) relative to the one or more movable or stationary press tools. The movable pin 23 may be provided in any shape and/or size such that when extended from the one or more movable or stationary press tools it is capable of occupying a portion of the cavity 13. In one exemplary embodiment, the movable pin 23 may have a shape that is generally cylindrical (e.g., rod-shaped) so that the resultant block may include a through-hole.

As mentioned above, the pressing tool may include at least one movable pin 23. As such, it is appreciated that the movable pin 23 may be provided in at least one of the one or more movable press tools and/or the optional one or more stationary press tools, when included. For example, that the pressing tool may include a stationary lower press tool with a movable pin 23 and a movable upper press plunger that may be configured to independently move towards or away from the stationary lower press tool. Preferably, though not required, the pressing tool includes a plurality of movable press plungers such as a lower press plunger and an upper press plunger that may be configured to be independently movable relative to each other (e.g., towards or away from one another). In this example, the lower press plunger may include the movable pin 23, though not required. However, it is further appreciated that other combinations/orientations of the one or more movable press plungers and/or the optional one or more stationary press tools may be provided in various arrangements wherein at least one of the one or more movable press plungers and the optional one or more stationary press tools may include at least one movable pin 23.

Referring to FIG. 1A, a cross-section of the die 16 is provided, which may include at least one wall 11 surrounding a movable lower press plunger 16 to define a cavity 13 therebetween, wherein the lower press plunger 16 may include an independently movable pin 23. The lower press plunger 16 has an upper surface 17 that in addition to an upper portion 27 of the movable pin 23 (in a first position e.g., non-extended position) will define at least one surface of the resultant block to be formed. In this specific example, the upper surface 17, and the upper portion 27 of the movable pin 23 in a non-extended position may define a generally flat surface. However, it is appreciated that the upper surface of the lower press tool (whether movable or stationary) may have any shape or topographical geometry.

Figure 1B:
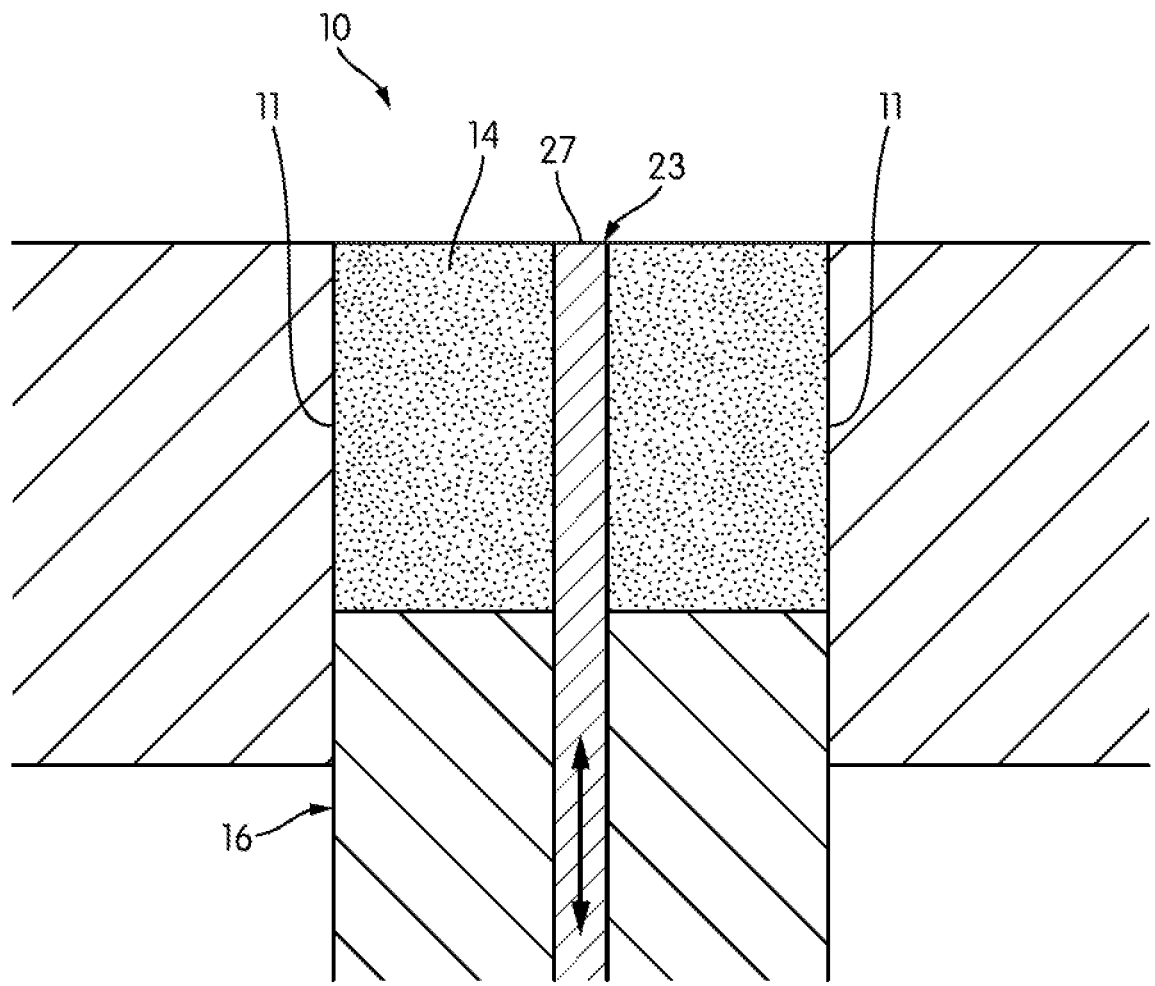
FIG. 1B is a cross-sectional view of a device according to another step of the method of the present invention performed using the device.

As mentioned above, the movable pin 23 may be provided generally in the shape of a rod such that when extended (a first extended position) from the lower press plunger 16, a portion of the cavity 13 is occupied by the extended portion of the movable pin 23 (FIG. 1B). Once the movable pin 23 is located in the first extended position, a pourable granulate in the form of a first ceramic material 14 is filled into the cavity 13 of the die 10 while surrounding the movable pin 23 to form a first layer 25 (FIG. 10). Preferably, the upper portion 27 of the movable pin 23 may be extended to a distance from the upper surface 17 of the lower press plunger that is greater than a level that the first material 14 will be filled into the cavity 13. However, it is appreciated that the upper portion 27 of the movable pin 23 may be moved to an extended position that is less than the height of the first material 14 after filling a portion of the cavity 13. Furthermore, it is contemplated that the cavity 13 may be filled with the first ceramic material 14 prior to and/or during the extension of the movable pin 23 into the cavity 13 (e.g., from a non-extend, position being generally level/flush with the surrounding portion of the upper surface 17 of the lower press tool).

Figure 6A:
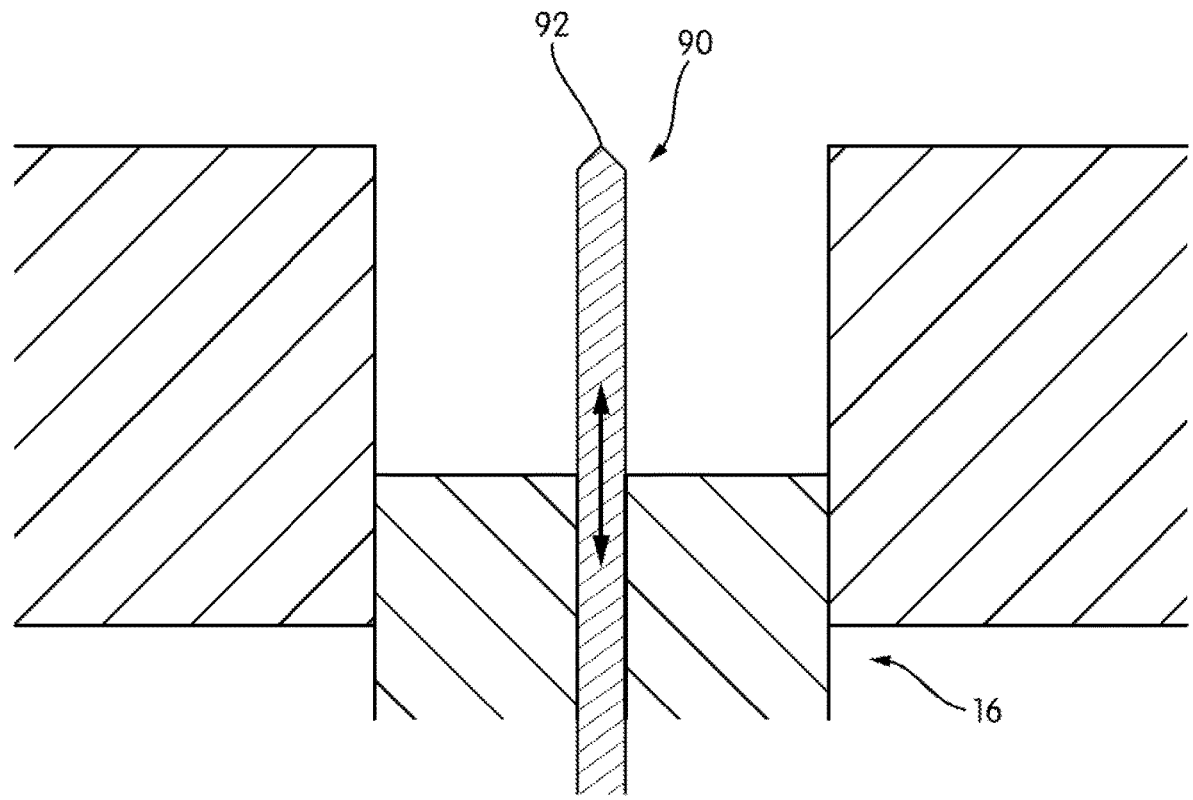
FIG. 6A is a cross-sectional view of an alternative device according to another step of the method of the present invention performed using the device.
Figure 6B:
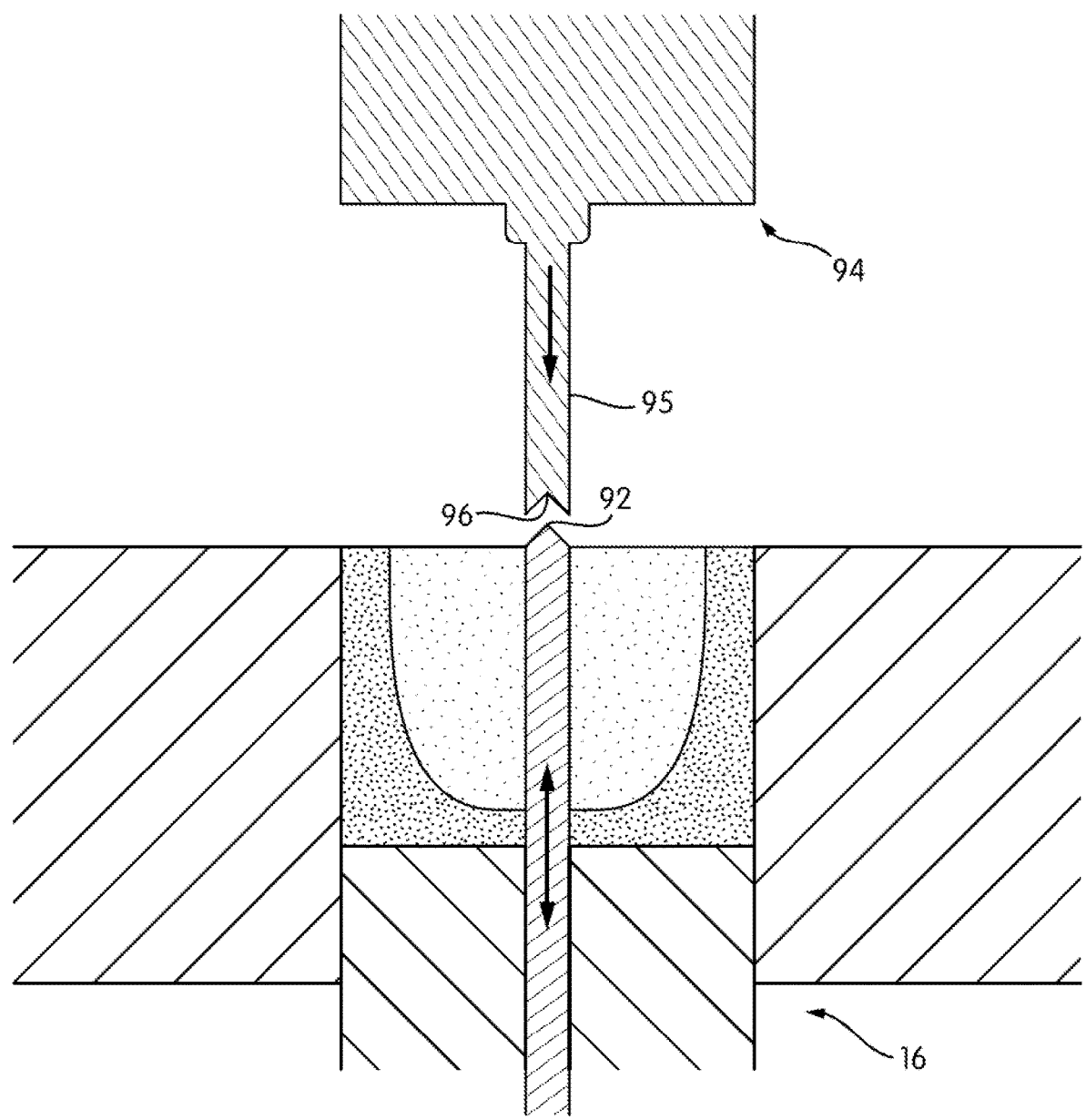
FIG. 6B is another cross-sectional view of the alternative device shown in FIG. 6A.

In another example as shown in FIGS. 6A-6B, a movable pin 90 may be provided according to the present invention. The movable pin 90 may include a tapered end 92 which differs from the movable pin 23 having a generally flat end 27. When included, an alternative second upper press plunger 94 may also be provided having lower extension portion 95 extending towards the lower press plunger 16. The lower extension 95 having the seat portion 40 and a distal end 96. The distal end 96 of the alternative second upper press plunger 94 preferably corresponds (mates) with the tapered end portion 92 of the movable pin 90 to aid in the movement of either the movable pin 90 and/or the alternative second upper press plunger 94 during the formation of the blank. It is appreciated that this corresponding configuration help keep the distal end 27 engaged with the tapered end 92 during movement to reduce or eliminate disengagement (e.g., horizontally or otherwise) between the movable pin 90 and the alternative second upper press plunger 94. It is appreciated that other similar corresponding configurations may be provided in the distal end 27 of the alternative second upper press plunger 94 and tapered end 92 of the movable pin 90.

The first ceramic material 14, which is in particular a zirconium dioxide stabilized with yttrium oxide, can have the following composition in wt %:

| | |
|---|---|
| $HfO_2$ | <3.0 |
| $Al_2O_3$ | <0.3 |
| $Y_2O_3$ | 4.5 to 10.5 |
| Color-imparting oxides: | 0-0.5 |
| Technically caused, unavoidable components ≤ 0.2 (such as $SiO_2$, $Fe_2O_3$, $Na_2O$) $ZrO_2$ | |
| 100 − ($Y_2O_3$ + $Al_2O_3$ + $HfO_2$ + color-imparting oxides + technically caused, unavoidable components) | |

A binding agent may also be added, but is not taken into consideration in the above percentage by weight values.

However, in particular it is provided for the composition to contain coloring oxides only in small amounts or not at all, for example ≤0.5 wt %, as the first ceramic material 14 is used as an incisor material, so that a high translucency is desired. As a result of the relatively high percentage of yttrium oxide, the tetragonal crystal phase may be only 50 to 60% in the incisal region of the produced mold part, i.e., the dental restoration, and the remainder is the cubic and monoclinic crystal phase.

Figure 1C:
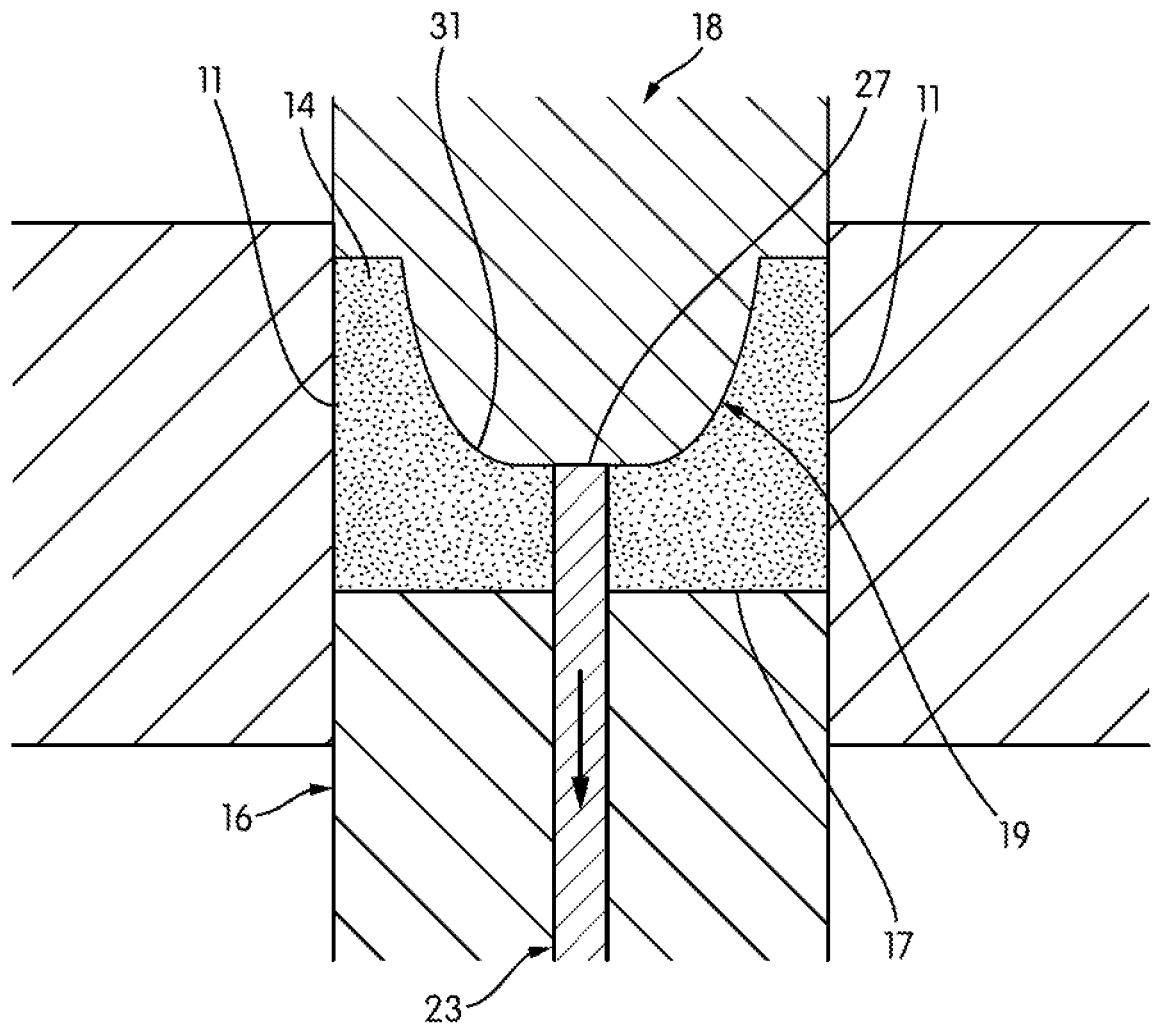
FIG. 1C is a cross-sectional view of a device according to another step of the method of the present invention performed using the device.
Figure 1D:
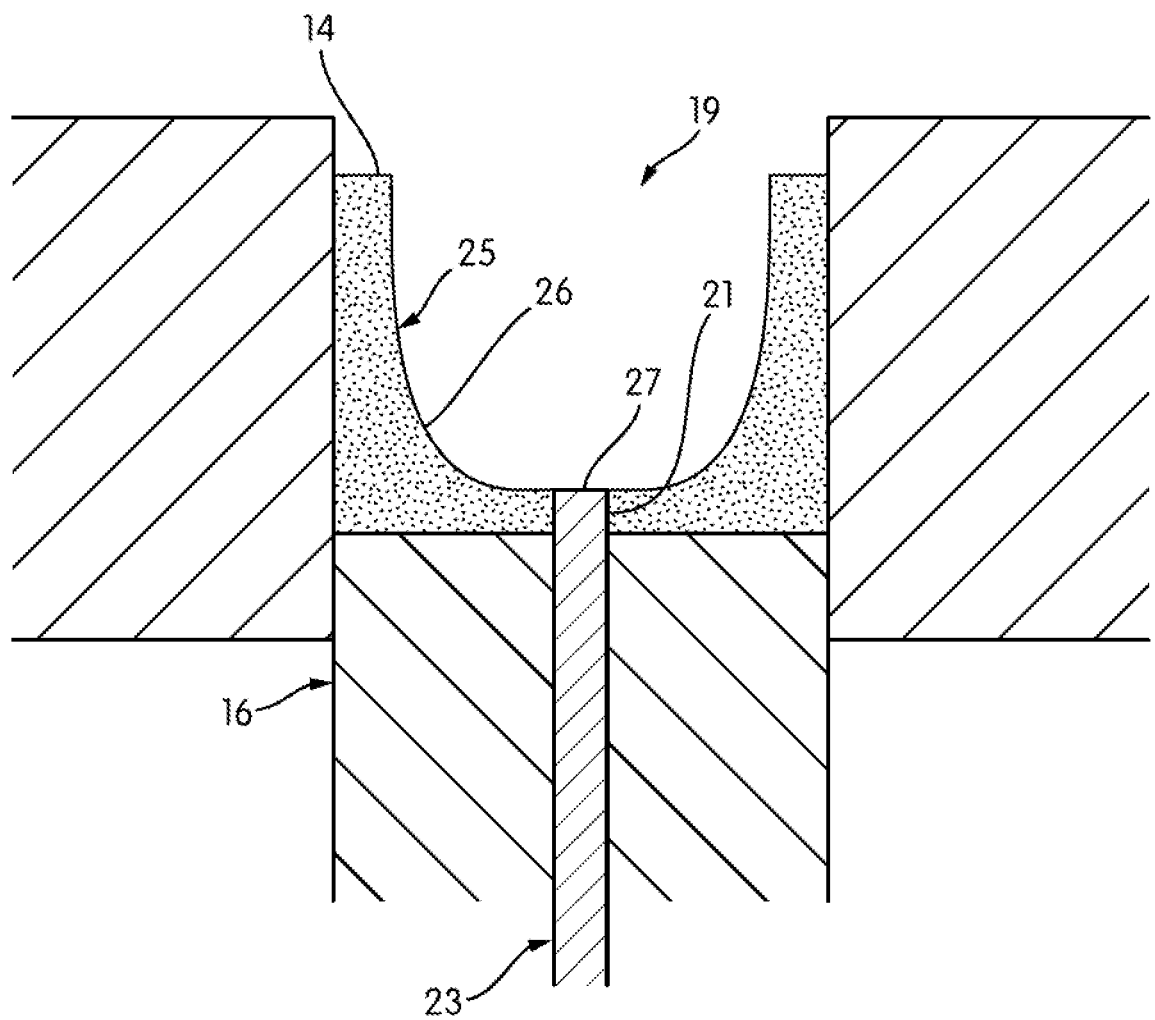
FIG. 1D is a cross-sectional view of a device according to another step of the method of the present invention performed using the device.

As shown in FIGS. 1C-1D, by means of a first upper press plunger 18 an open cavity 19 is formed in a material 14 or in a layer formed from this material. By means of the first upper press plunger 18, the movable pin 23 is pushed (or independently retracted) towards the upper surface 17 of the lower press plunger 16 while the material 14 is displaced or slightly compacted. In doing so, a through-hole 21 in communication with the cavity 19 is formed. The compaction/pressing to form the first cavity 19 may be conducted at a pressure greater than 2, and preferably greater than 7 bars within the die. Furthermore, the compaction/pressing to form the first cavity 19 may be conducted at a pressure of less than 100, and preferably less than 50 bars within the die. It is appreciated that the compaction/pressing to form the first cavity 19 may be conducted at a pressure ranging from 2 to 100, and preferably from 7 to 50 bars within the die. It is appreciated that any intermediate layer (excluding the final layer) may be compacted/pressed at a pressure similar to that conducted during the forming of the first layer.

After the first layer 25 has been formed (e.g., compacted/pressed), the first upper press plunger 18 may be removed from the cavity 19 while at least a portion of the movable pin 23 remains positioned within the first layer 25 to prevent the material 14 from being disposed in the through-hole 21 (FIG. 1D). Optionally, or in addition to the pressing movement of the first upper press plunger 18, a movable lower press plunger 16 may assist in the compaction of the first material 14 by moving towards the first upper press plunger 18. It is appreciated that during the movement of the lower press plunger 16, the movable pin 23 is configured to move independently thereof to ensure that the through-hole 21 is maintained. For example, while the lower press plunger 16 is moving towards the first upper press plunger 18, the movable pin 23 may be retracted (and/or pushed) in an opposite direction relative to the movement of the lower press plunger 16 through independent movement by itself and/or through the movement of the first upper press plunger 18 as it moves towards the lower press plunger 16. Additionally, it is contemplated that the movable pin 23 may be movable independently of the first upper press plunger 18 and/or the lower press plunger 16 or in combination with or by the movement of (or contact by) at least one of the first upper press plunger 18 and the lower press plunger 16. While the movable pin 23 is being retracted from the cavity 19 towards the upper surface 17 of the lower press tool, at least some contact is maintained between the upper portion 27 of the movable pin 23 and the first upper press plunger 18 to prevent or substantially prevent the first material 14 from entering the through-hole 21. In another non-limiting example, as the first upper press plunger 18 displaces/compacts the first material 14 (towards the lower press tool), it may also push the upper portion 27 of the movable pin 23 to retract the movable pin 23 towards the first surface 17 of the lower press tool to define the cavity 19.

Figure 2A:
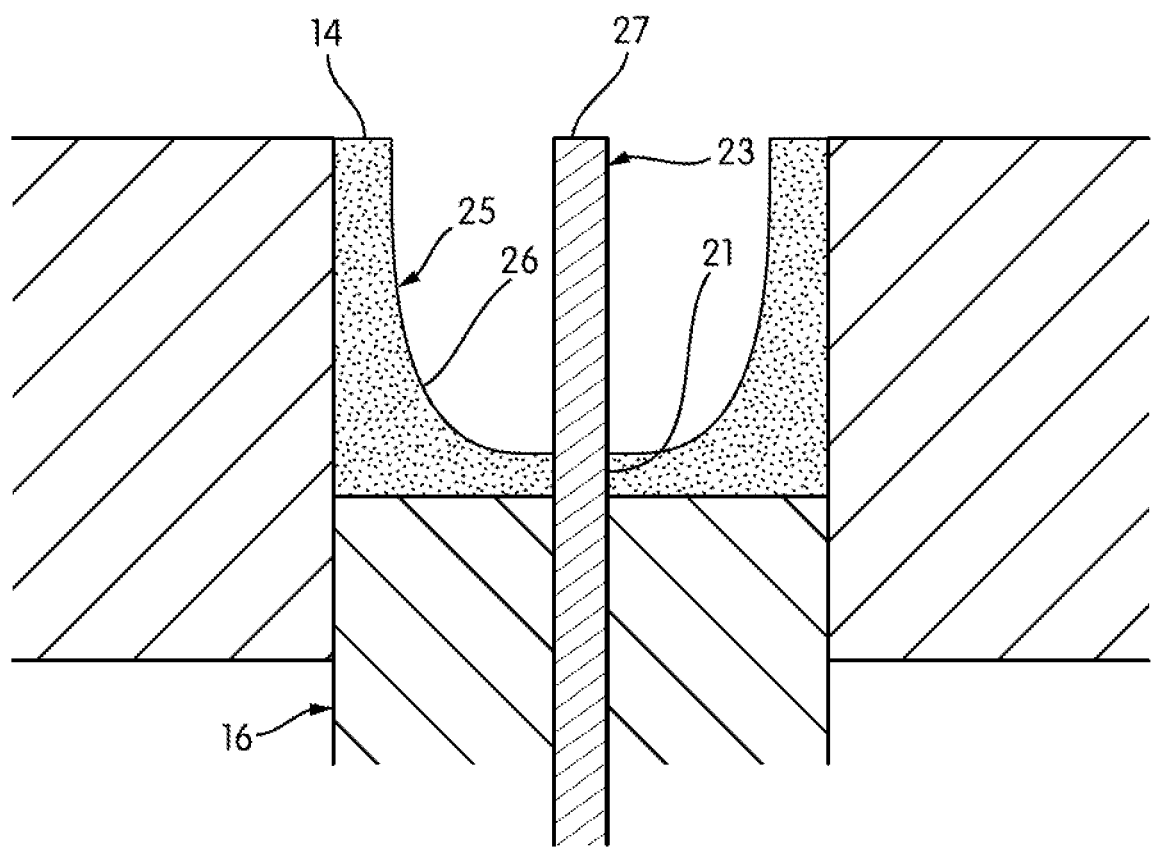
FIG. 2A is a cross-sectional view of a device according to another step of the method of the present invention performed using the device.
Figure 2B:
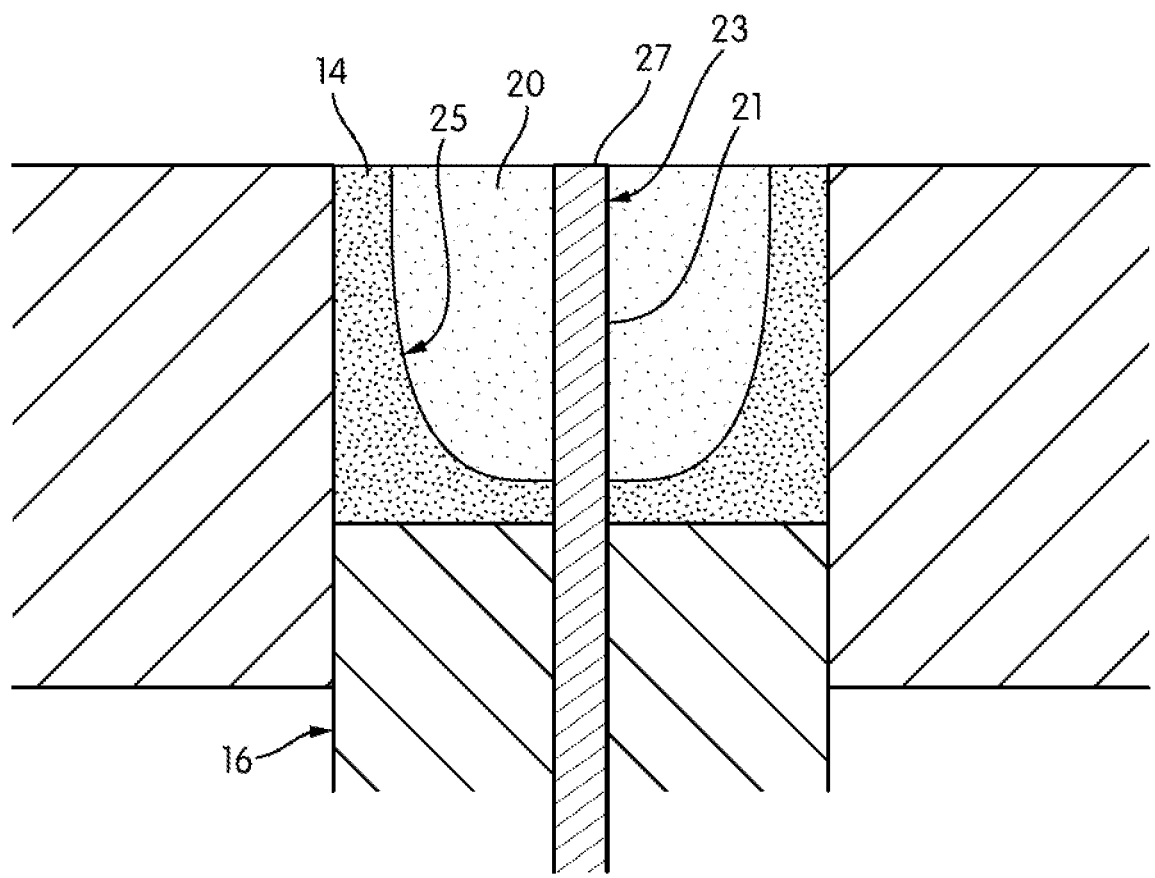
FIG. 2B is a cross-sectional view of a device according to another step of the method of the present invention performed using the device.

Once the first layer has been formed through the compaction of the first material 14 and the (partial) retraction of the movable pin 23, the first upper press plunger 18 may be removed (or partially removed) from the cavity 19. During or after the removal of the first upper press plunger 18 to expose the cavity 19, the movable pin 23 may be extended upward from the first layer 25 so as to occupy a portion of the cavity 19 (FIG. 2A). A second ceramic material 20 may be optionally filled into the cavity 19 while surrounding the extended movable pin 23 to initiate the forming of a second layer 29 (FIG. 2B). It is appreciated that the movable pin 23 may be extended into the cavity 19 at a distance such that when the second ceramic material 20 is filled into the cavity 19, the upper most portion 27 of the movable pin 23 may be positioned just above (or level with) the surface 31 of at least a portion of the second material 20. In an alternate embodiment, the upper most portion 27 of the movable pin 23 may remain generally level with the exposed surface 26 of the compacted first layer 25 and that after filling the cavity 19 with the second material 20, the movable pin 23 may be extended until the upper portion 27 of the movable pin 23 pushes through the surface 31 of second material to extend and maintain the through-hole 21 through the second layer 29 (not shown).

The second material 20 may have one of the following compositions in wt %:

| | |
|---|---|
| HfO$_2$ | <3.0 |
| Al$_2$O$_3$ | <0.3 |
| Y$_2$O$_3$ | 4.5 to 9.5 |
| Color-imparting oxides: | 0-1.5 |
| Technically caused, unavoidable components ≤ 0.2 (such as SiO$_2$, Fe$_2$O$_3$, Na$_2$O) 100 − (Y$_2$O$_3$ + Al$_2$O$_3$ + HfO$_2$ + color-imparting oxides + technically caused, unavoidable components) | |

Thereby, the coloring oxide or oxides may be present in an amount that results in a desired tooth color, since the dentine of the tooth to be produced is formed from the second ceramic material 20. The relatively low percentage of Y$_2$O$_3$ further ensures that the dentine of the fully-sintered tooth replacement has a high tetragonal phase content of at least 50%, preferably at least 60%, thus yielding a high strength.

Figure 2C:
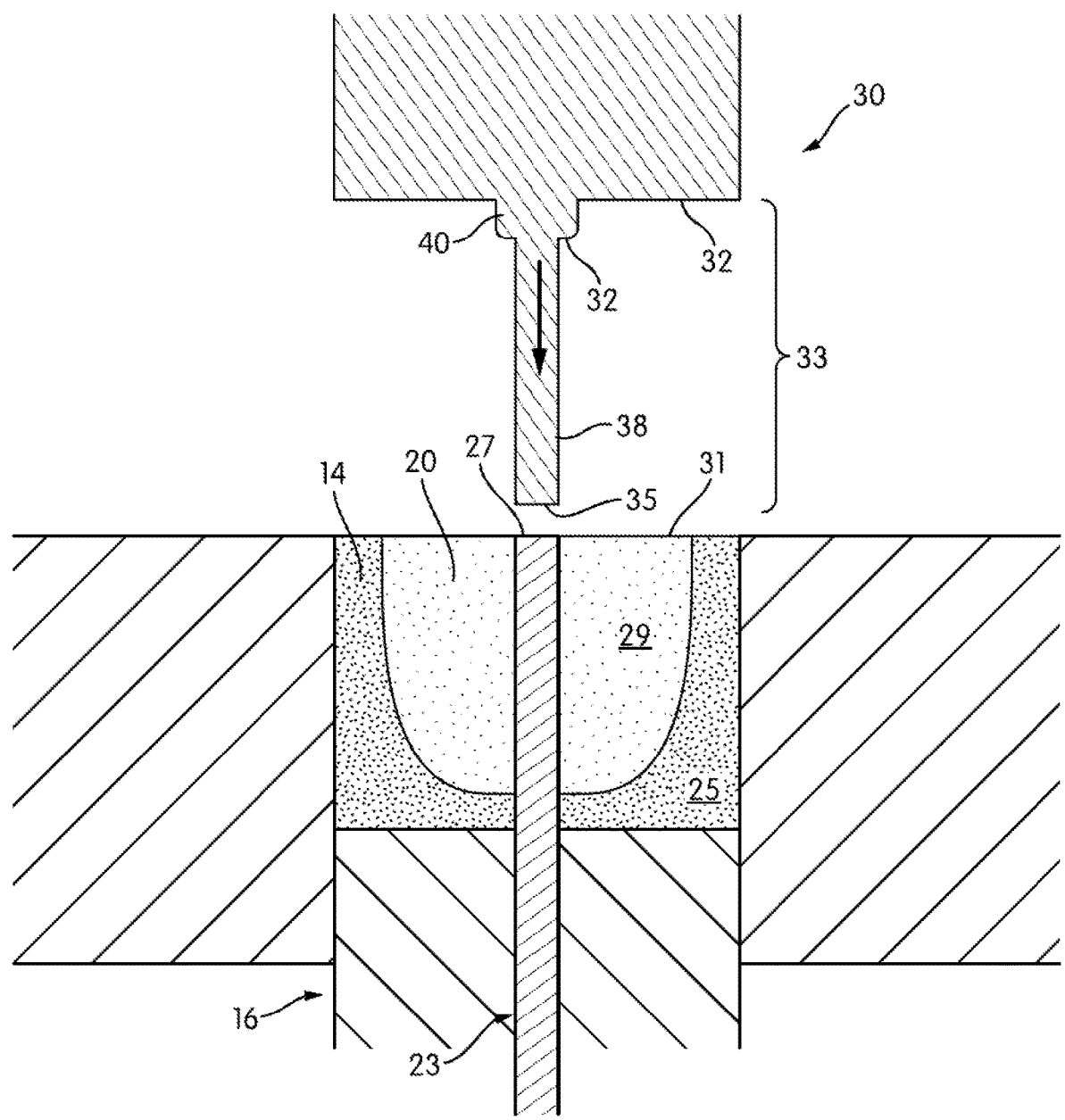
FIG. 2C is a cross-sectional view of a device according to another step of the method of the present invention performed using the device.
Figure 2D:
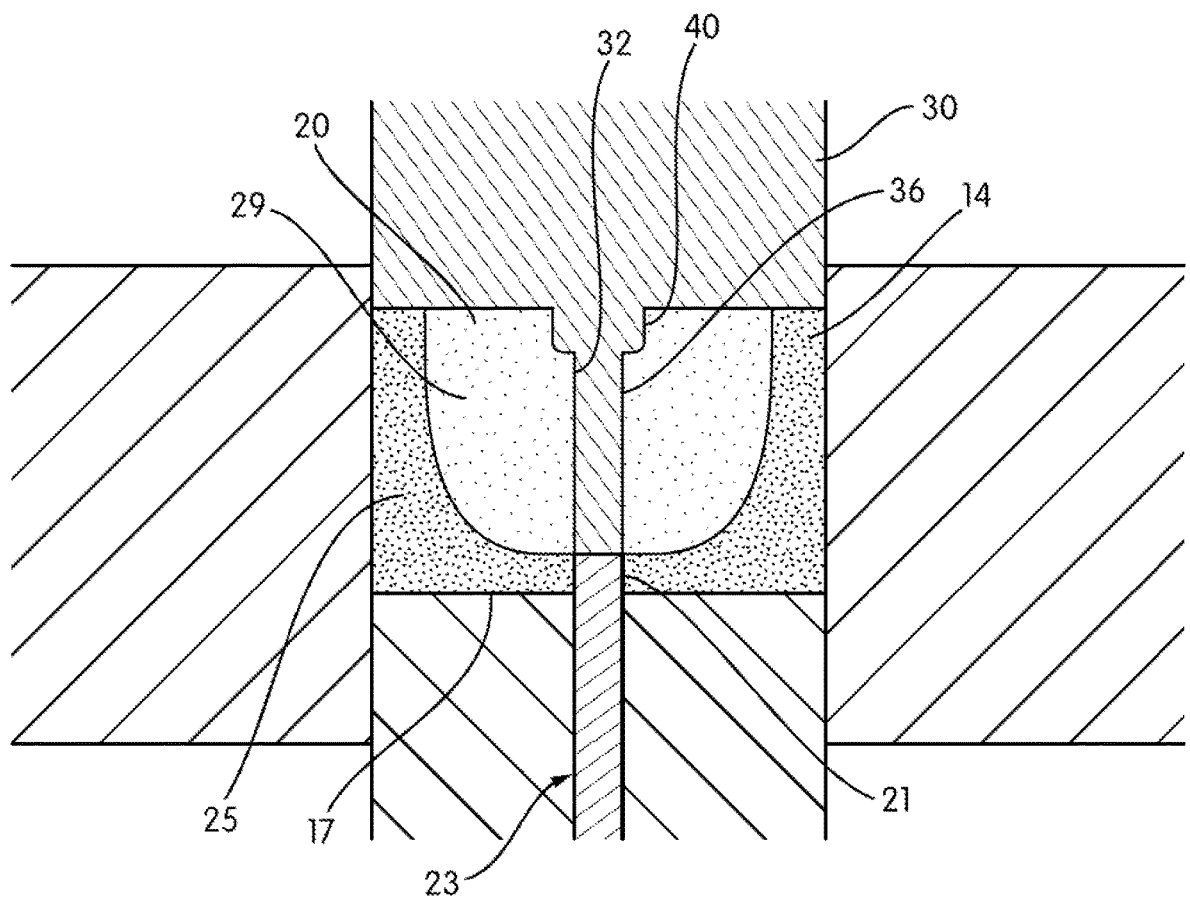
FIG. 2D is a cross-sectional view of a device according to another step of the method of the present invention performed using the device.

Preferably, the movable pin 23 is extended prior to filling the cavity 19. After filling the cavity 19 while surrounding the movable pin 23 with the second ceramic material 20, the materials 14, 20 respectively the layers or regions formed from these, are pressed in the die 10 by means of the pressing tool, which may further include a second movable upper press tool (plunger) 30 (FIG. 2C). The second upper press plunger 30 may include a lower surface 32 that may be configured with any general shape of any size, which will define a second cavity 36 formed in the second layer as a result of the compaction. Preferably, the second cavity 36 is in communication with the through-hole 21 so that the through-hole 21 may be further extended into the second layer 29. This may be accomplished through the pressing of the second material by the second upper press plunger 30 as a portion of the second upper press plunger 30 remains in general contact with the movable pin 23 (FIG. 2D). More particularly, as the second press plunger 30 moves towards the lower press tool the second press plunger 30 may push the movable pin 23 (or the movable pin 23 may independently retract) towards the upper surface 17 of the lower press tool so that the through-hole 21 may be extended into the second layer 29 while being generally maintained in both the first and second layers 25, 29 during the pressing/compaction step.

Once the second material 20 is compacted by the second upper press plunger 30 (with the help of the lower press tool, which may be movable or stationary), the second cavity 36 may be formed in the second layer 29 as a result of the shape of the lower surface 32 of the upper press plunger 30 and the extended movable pin 23. In one specific example shown in FIG. 2C, the second upper press plunger 30 may include an extension portion 33 defined by the lower surface 32 of the second upper press plunger 30. Here, the extension portion 33 may define a generally "screw" shaped outline/profile having a lower cylindrical portion 38 and an upper seat portion 40, however, as discussed above other shapes and sizes are contemplated for defining portions of the lower surface 32. Preferably, a distal end 35 of the lower cylindrical portion 38 may be configured to complement (and/or mate with) the shape/size of the upper portion 27 of the movable pin 23 so that the communication/contact of the distal end 35 with the upper portion 27 will aid in the continuation of the through-hole 21 from the first layer 25 through at least a portion of the second layer 29. It is appreciated that the remaining portion of the lower surface 32 of the second upper press plunger 30 may be generally flat to aid in the forming of the generally flat outer wall of the cuboid shaped block of the present invention.

Figure 2E:
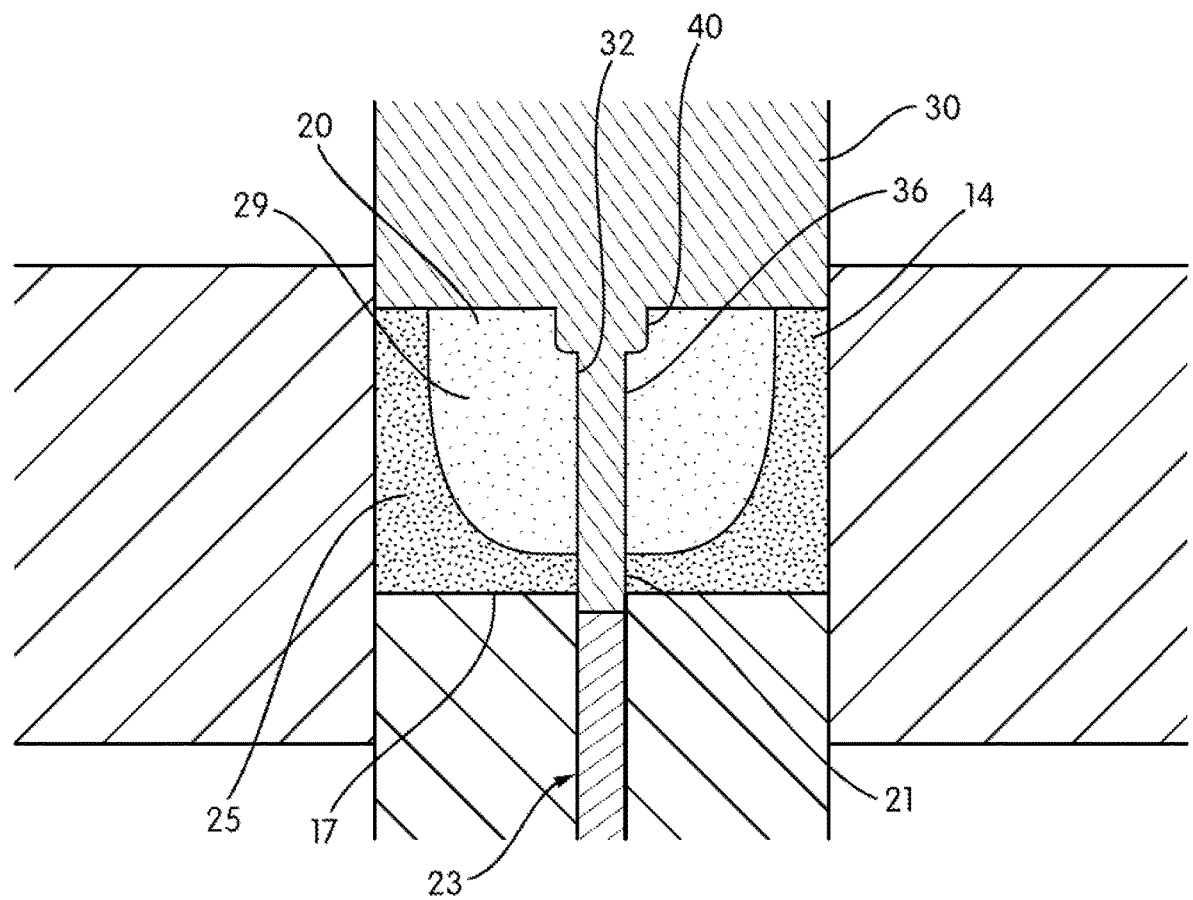
FIG. 2E is a cross-sectional view of a device according to alternative step of the method of the present invention performed using the device.

As can be seen in FIG. 2D and an alternative FIG. 2E, the lower portion 38 of the second upper press plunger may be of various lengths such that when the second pressing step is completed or substantially completed the distal end 35 of the lower portion 38 may extend through only a portion of the first and second layers 25, 29 (e.g., through only the second layer), as shown in FIG. 2D or it may extend through both the first and second layers 25, 29 as shown in FIG. 2E. In either case or if the distal end 35 of the lower portion 38 extends to a different depth within the mold, the movable pin 23 is positioned accordingly within the mold to ensure that the upper end portion of the movable pin 23 remains in contact with the distal end 35 of the lower portion 38 of the second upper press plunger 30 during the pressing steps to maintain the through-hole through the first and second ceramic materials.

It is appreciated that the upper seat portion 40 of the second upper press plunger 30 may define a negative geometry for an upper portion of an attachment device such as a screw or an upper (metal) part of a lower section of a two-piece abutment (e.g., Ti-base). Preferably, though not required, the upper seat portion 40 (e.g., a seat portion and/or a screw seat portion) includes an external shape configured to form an anti-rotation feature provided in the connection geometry of the blank (e.g., zirconia block with through-hole) to prevent rotation of the abutment or two-piece abutment (e.g., the zirconia portion surrounding the metal part of the Ti-base) against each other.

Figure 7A:
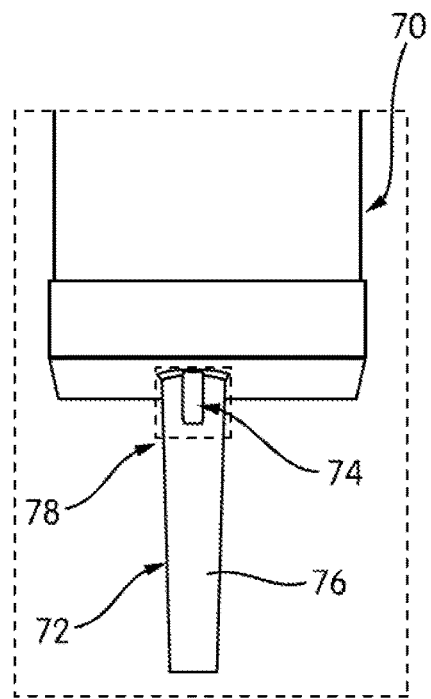
FIG. 7A is a front view of another alternative device according to another step of the method of the present invention performed using the device.
Figure 7B:
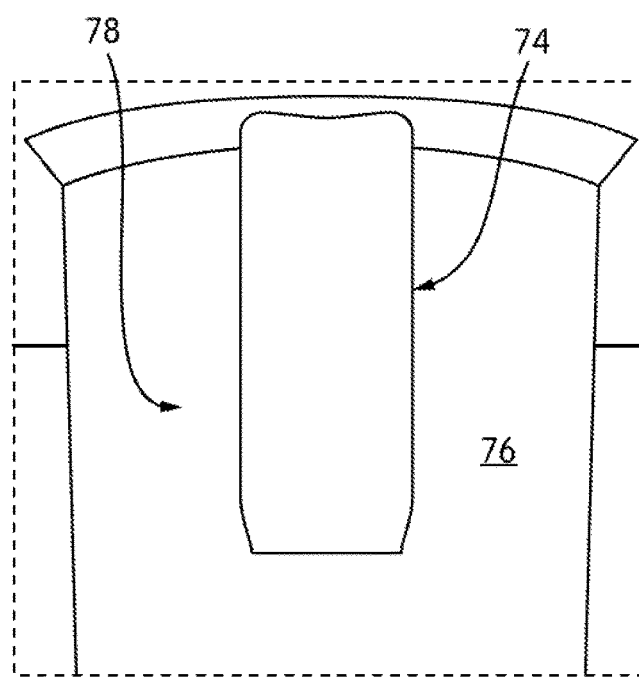
FIG. 7B is zoomed in front view of the alternative device shown in FIG. 7A.
Figure 7C:
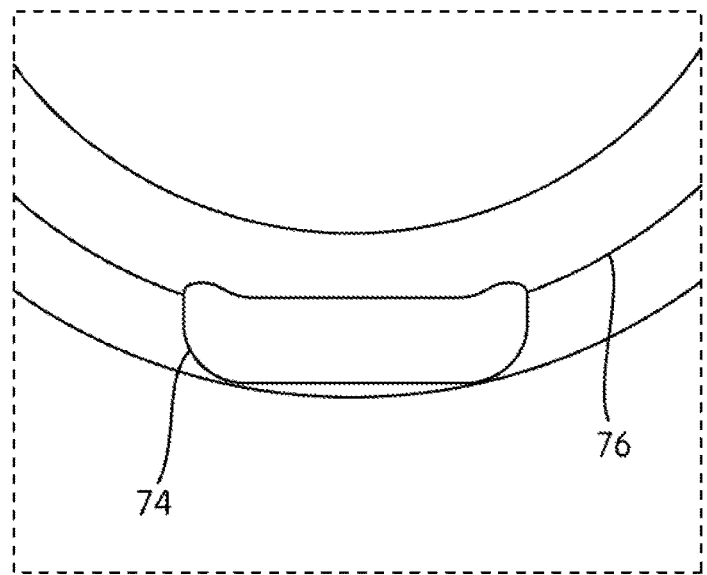
FIG. 7C is a zoomed in top view of the alternative device shown in FIG. 7A.

In one non-limiting example as shown in FIGS. 7A-7C, an alternative second upper press plunger 70 may include a conical and/or cylindrical shaped extension portion 72 having an anti-rotation feature 74. The anti-rotation feature 74 may extend outward (e.g., radially) as shown in FIG. 7C from an exterior surface 76 of the second upper press plunger 70. As shown in FIG. 7B, the anti-rotation feature 74 may further extend downward along an upper portion 78 of the extension portion 72 of the second press plunger 70. The anti-rotation feature 74 may be configured with any shape and/or size so as to prevent rotation of the abutment or two-piece abutment (e.g., the zirconia portion surrounding the metal part of the Ti-base) against each other. Other non-limiting examples of anti-rotation shape may include, but are not limited, to polygonal shapes such as hexagonal and/or otherwise.

As discussed above, the second upper press plunger 30 may be introduced into the die 10 and working with the lower press tool, a compaction results thereby forming a second layer 29 in addition to the already formed first layer 25. After pressing, the blank 44 may have a density of approximately 3 g/cm$^3$. The compaction/pressing to form the resultant block may be conducted at a pressure greater than 500 and preferably greater than 100 bars within the die. Furthermore, the compaction: pressing to form the resultant block may be conducted at a pressure of less than 20,000, and preferably less than 10,000 bars within the die. It is appreciated that the compaction/pressing to form the resultant block may be conducted at a pressure ranging from 500 to 20,000, and preferably from 1000 to 10,000 bars within the die.

The resultant block may generally have a cuboid shape, though not required. When included, the resultant block may have a length with a distance greater than 5, and preferably greater than 8 mm. Furthermore, the resultant block may have a length with a distance less than 75, and preferably less than 60 mm. It is appreciated that the resultant block may have a length with a distance ranging from 5 to 75 (e.g., 30), and preferably from 8 to 60 (e.g., 20) mm. Additionally, the resultant block may have a width with a distance greater than 5, and preferably greater than 8 mm. Furthermore, the resultant block may have a width with a distance less than 75, and preferably less than 60 mm. It is appreciated that the resultant block may have a width with a distance ranging from 5 to 75 (e.g., 30), and preferably from 8 to 60 (e.g., 20) mm. Lastly, the resultant block may have a height with a distance greater than 2, and preferably greater than 5 mm. Furthermore, the resultant block may have a height with a distance less than 55, and preferably less than 45 mm. It is appreciated that the resultant block may have a height with a distance ranging from 2 to 55 (e.g., 30), and preferably from 5 to 45 (e.g., 21) mm.

With regard to the ceramic materials 14, 20 it may also be noted that they may have a bulk density between 1 g/cm$^3$ and 1.4 g/cm$^3$. After pressing, the density may be approximately 3 g/cm$^3$.

As shown in FIGS. 1C-1D, it can be seen that the cavity 19 may be formed by the upper press plunger 18 in the first ceramic material 14, respectively in the first layer 25 comprising the material and a through-hole 21 formed from a movable pin 23. On the base side wall 11 of the die 10 may be limited by the lower press plunger 16.

As can be seen from FIG. 2D, a second cavity 36 may be formed in the second material 28 with the through-hole 21 continuing its extension therethrough after its compression by the press plungers 16, 18 to form a block with a through-hole. Thereafter, the block may be optionally pre-sintered and/or fully sintered and/or optionally milled.

Irrespective of whether the second cavity 36 may be present or not, a pre-sintering of the blank may be carried out (i.e., after pressing) at a temperature in particular in the range between 850° C. and 1050° C. over a time period between 100 minutes and 150 minutes. There is initially a debinding and then pre-sintering. The density of the blank after the pre-sintering may be approximately 3 g/cm$^3$. The bending strength of the pre-sintered blank 28 may be between 15 MPa and 45 MPa.

The blank 44 may further be provided with a holder 46 (FIG. 3) affixed (or removably affixed), so that the blank 44 with the preformed through-hole 42 can be worked for example in a milling or grinding machine to derive a dental restoration with a screw-hole 48 (not shown) such as a tooth 49 from the blank 44 with the preformed through-hole 42, as explained with reference to FIG. 4. Thereby, the tooth to be produced may be at least virtually laid in the blank 44 with a preformed through-hole 42 such that the incisal region runs into the region 52 formed by the first ceramic material 14 and the dentine region in sections runs into the second region 54 formed by the second ceramic material 20. The blank 44 with a preformed through-hole 42 may be then worked taking this data into consideration.

Figure 4A:
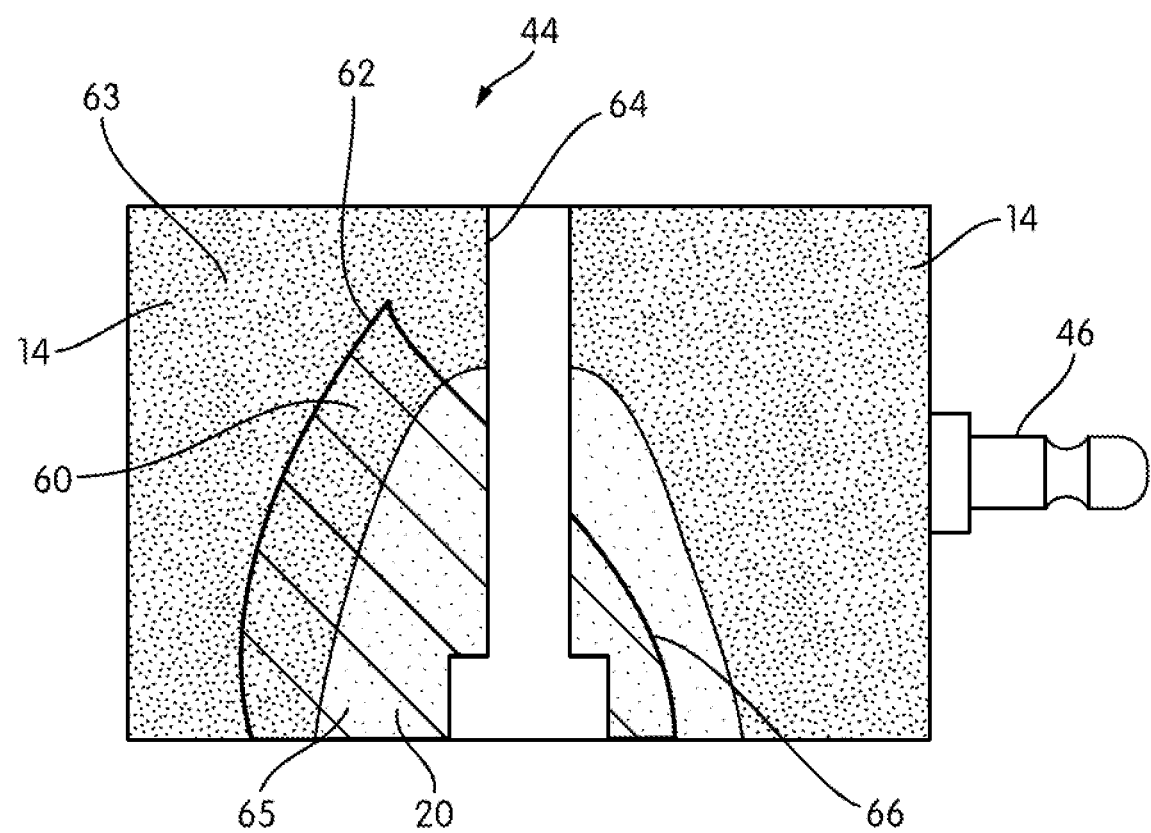
FIG. 4A shows a schematic of a blank having a pre-formed through-hole according to the present invention with an anterior tooth to be derived therefrom.

As FIG. 4A illustrates, a dental restoration with a screw-hole according to the present invention, in an example embodiment, a tooth 62, may be derived from the blank 44. For this purpose, with knowledge of the course of the first region 63 from the first ceramic material 14 and the second region 65 from the second ceramic material 20 in the blank 44 of the tooth 62 to be produced may be virtually laid in the regions 63, 65 such that the incisor 60 extends in the first region 63 and the dentine 66 extends into the second region 65.

After removal of the so virtually positioned tooth 62 from the blank 44, a tooth replacement is available, which in principle can be used directly, in particular does not require any veneer. A monolithic tooth 62 with a screw-hole 64 may be prepared on the basis of the teaching of the invention. In this case, the preparation from the blank 44 is made easier in that the first and second regions 63, 65 already has a screw-hole 64 for optionally being connected to an implant (not shown).

Figure 4B:
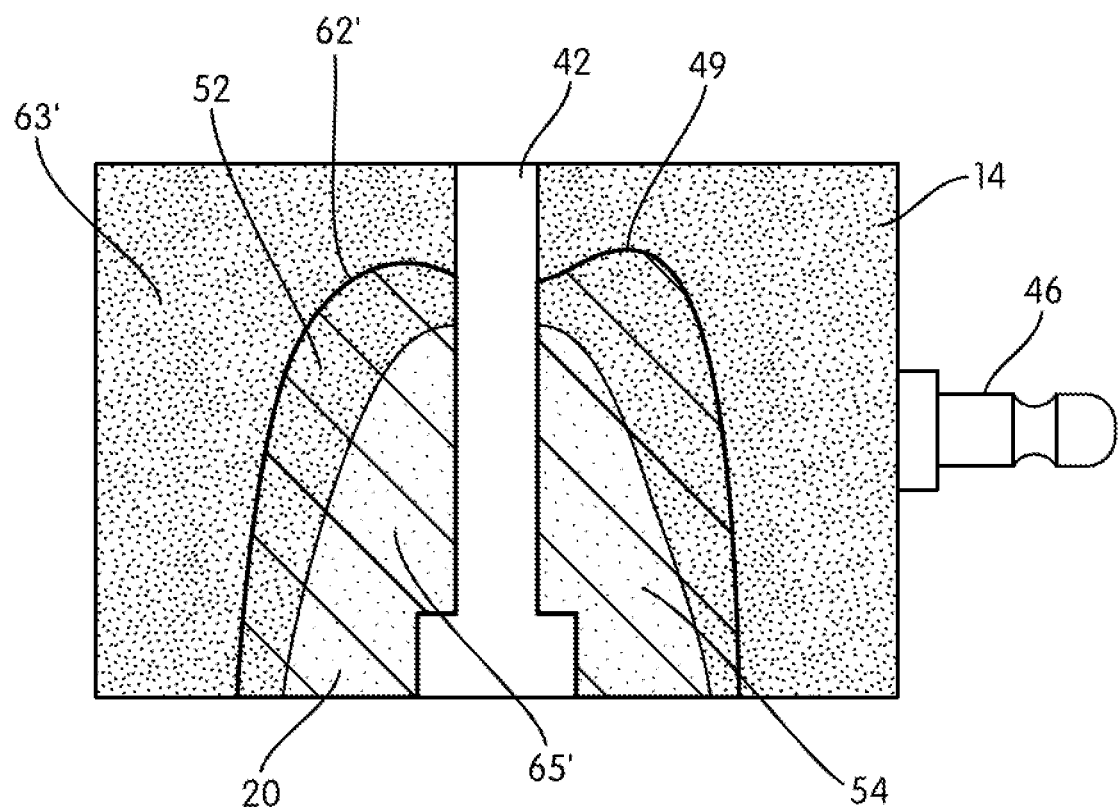
FIG. 4B shows a schematic of a blank having a pre-formed through-hole according to the present invention with a molar tooth to be derived therefrom.

As FIG. 4B illustrates, a dental restoration with a screw-hole according to the present invention, in an example embodiment, a molar tooth 62', may be derived from the blank 44. For this purpose, with knowledge of the course of the first region 63' from the first ceramic material 14 and the second region 65' from the second ceramic material 20 in the blank 44 of the tooth 62' to be produced may be virtually laid in the regions 63', 65' such that the incisor 52 extends in the first region 63' and the dentine 54 extends into the second region 65'.

After removal of the so virtually positioned molar tooth 62' from the blank 44, a tooth replacement is available, which in principle can be used directly, in particular does not require any veneer. A monolithic tooth 62' with a screw-hole 42 may be prepared on the basis of the teaching of the invention. In this case, the preparation from the blank 44 is made easier in that the first and second regions 63', 65' already has a screw-hole 42 for optionally being connected to an implant (not shown).

Figure 5:
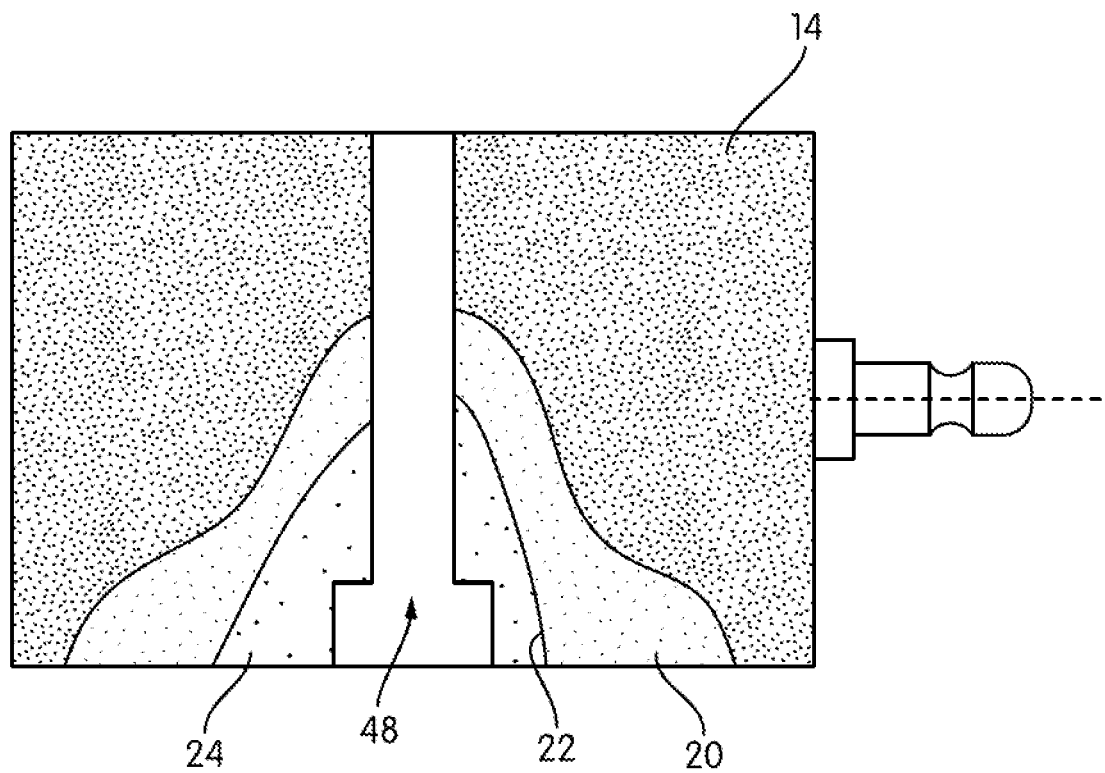
FIG. 5 shows another blank having a pre-formed through-hole according to the present invention with regions of different material properties.

FIG. 5 illustrates that after filling of the first cavity 19 in the first ceramic material 14 and filling of the second ceramic material 20 into the cavity 19, a second cavity 22 may be filled optionally in accordance with the present invention, so that a third ceramic material is filled into the cavity 22 so formed, which differs from the second ceramic material in its composition such that in particular a higher strength can be achieved. A through-hole 48 may similarly be formed through the third ceramic material 24, as explained herein.

The teaching of the invention introduces the possibility of forming a blank 58 that has a plurality of regions 52, 54, 56, that are made of the second and optionally the third ceramic material, and can have different geometries with a through-hole 53 extending through each region 52, 54, 56 (FIG. 8), so that corresponding teeth of different geometries can be formed. The so-called second regions 52, 54, and 56 formed from the second ceramic material 20 each having a through-hole 53 may be embedded in the first ceramic material 14, i.e., are surrounded by this, as can be seen in particular also from the Figures. The second regions 52, 54, and 56 are uncovered on the base side.

Figure 3:
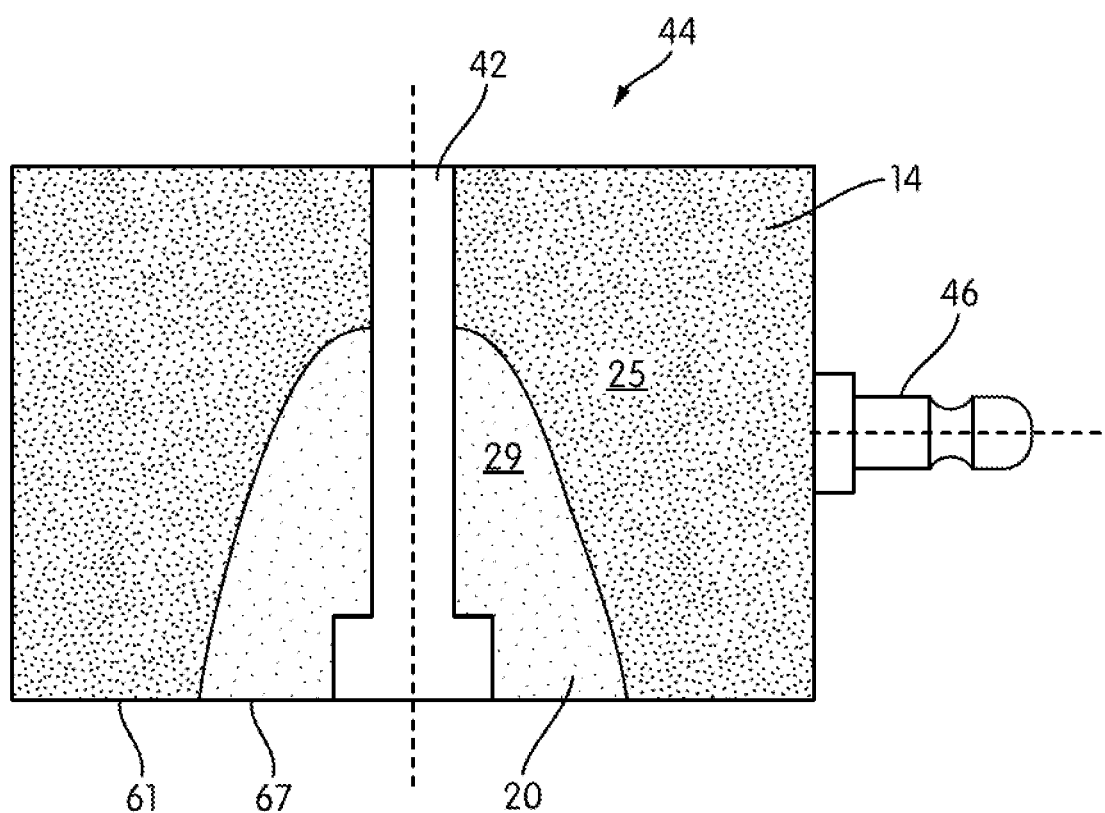
FIG. 3 shows a blank having a pre-formed through-hole according to the present invention with regions of different material properties.
Figure 8:
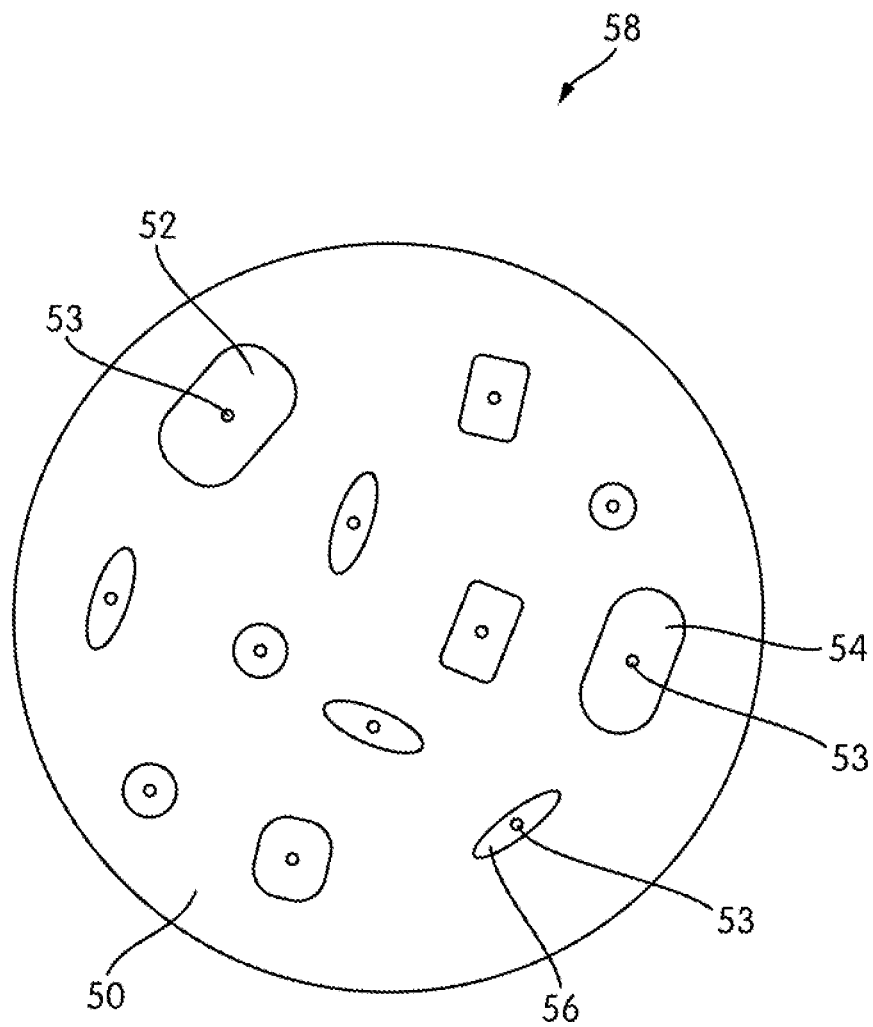
FIG. 8 shows a blank according to the present invention in a top view with a plurality of regions of different material properties, each region having a pre-formed through-hole.

As can be seen in particular from FIGS. 2D, 3, and 8, the second regions have external geometries that taper starting from the bottom, i.e., from the base region with the through-holes extending therethrough. It may be referred to as a tonus-like geometry, wherein the outer contour represents a freeform surface.

The base region 67, the base surface that limits it on the underside merges with the lower side of the base surface 61 of the first region 25 (FIG. 3).

To prepare the blank sections 52, 54, 56 also referred to as nests with the through-hole 53, it may be necessary as described with reference to FIGS. 1A-1D to have corresponding open cavities in the layer made of the first material 14 and designated as the first region 50, so that the pourable second ceramic material 20 can be filled into the cavities in the manner described above and then the materials 14, 20 can be pressed together, i.e., compacted.

With regard to the physical properties of the ceramic materials 14, 20 it is to be noted that in addition to a difference in translucency and strength properties, it may be further advantageous or preferable to have different thermal expansion coefficients. In particular, the invention provides for the first ceramic material 14 after full sintering to have a thermal expansion coefficient that is 0.2 µm/m*K to 0.8 µm/m*K lower than the second region 52, 54, 56 formed from the second ceramic material 20. As a result of this a compression stress is generated in the first region 50, i.e., in the incisor material, which leads to an increase in strength (FIG. 5).

With regard to the blanks, it is to be noted that these can have a cuboid shape, for example the dimensions 18×15×25 mm or a disk shape, for example with a diameter of 100 mm, without thereby affecting the teaching of the invention. This brings in particular as explained by reference to FIG. 6 the advantage that, for example, a plurality of second regions 52, 54, 56 so-called dentine cores can be formed in a disk-shaped blank, to yield restorations of different geometries, but with a favorable layer course with respect to translucency and strength.

Since the position of one or more second regions 52, 56, i.e., nests, optionally with different geometries is known, they can be stored in a data record. Then, the restorations to be produced, which are available as CAD data sets, are positioned relative to and in the blank sections so that the tooth replacement can be derived from the blank by milling and/or grinding.

Figure 9:
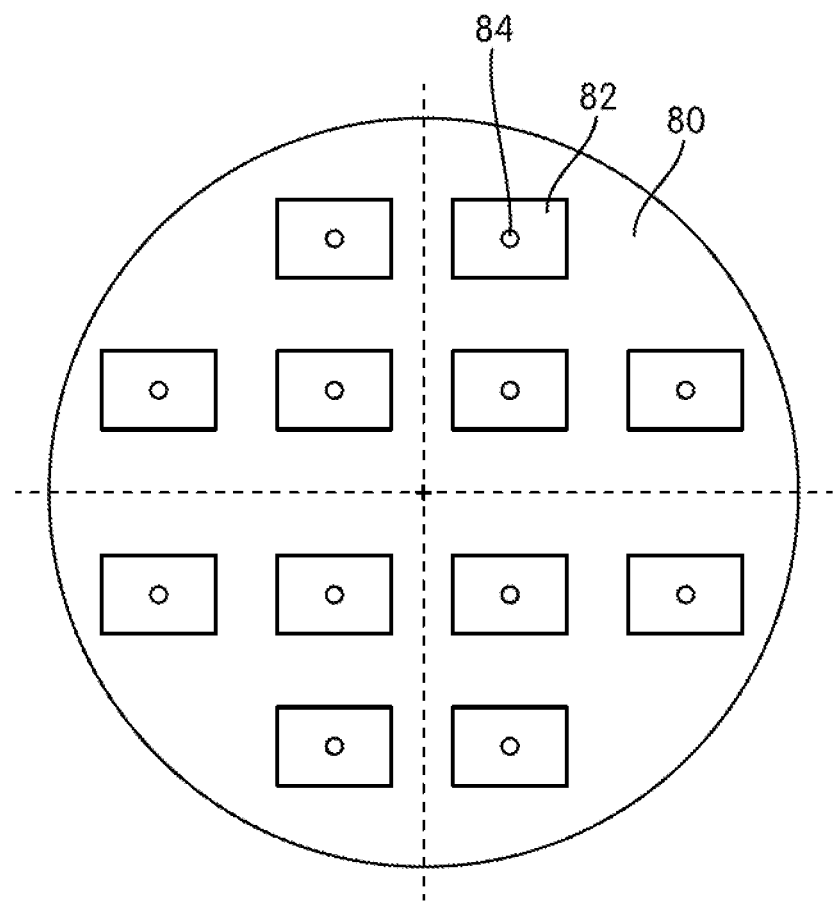
FIG. 9 is a top view of a holding device for mounting a plurality of blanks with pre-formed through-hole according to the method of the present invention.

With regards, to FIG. 9, a holder 80 is provided which includes a plurality of blanks 82 (removably affixed thereto) having preformed through-holes 84 according to the present invention. It is appreciated that the plurality of blanks 82 may be same or different and may include multiple layers of different compositions with a preformed through-hole extending through the respective blanks 82. For example, one or more blanks of the plurality of blanks 82 may have the same or different shape and/or size. Furthermore, one or more blanks may have multiple layers with different compositions from layer to layer or block to block. It is further appreciated that the blanks 82 may be removably attached to the mount 80, which may also be removably attached to a milling and/or grinding machine (not shown).

The invention claimed is:

1. A method for forming a multi-layer blank of a ceramic material comprising the steps of:
   providing a mold that includes at least one side wall surrounding a lower press plunger to form a cavity therebetween, wherein the lower press plunger has a movable pin;
   filling into the mold a first ceramic material, wherein the first ceramic material is filled in a pourable condition into the mold to form a first layer;
   extending the movable pin from an upper surface of the lower press plunger and into the cavity either prior to, during, or after filling the mold with the first ceramic material to form the first layer, wherein once the movable pin is at least partially extended into the cavity and the first layer is formed, at least a portion of the movable pin extends through the first layer thereby being surrounded by the first ceramic material to form a through-hole through the first layer;
   pressing a first upper press plunger against the first layer so that a first open cavity is formed while at least a portion of the first upper press plunger is in contact with the movable pin to maintain the through-hole through the first layer;
   filling into the mold a second ceramic material of a different composition, wherein the second ceramic material is filled in a pourable condition into the first open cavity to form a second layer;
   extending the movable pin from an upper surface of the first layer and into the first open cavity either prior to, during, or after filling the mold with the second ceramic material to form the second layer, wherein once the movable pin is at least partially extended into the first open cavity and the second layer is formed, at least a portion of the movable pin extends through the second layer thereby being surrounded by the second ceramic material to extend the through-hole through the second layer; and
   pressing a second upper press plunger against the second layer so that a second open cavity is formed in communication with the through-hole that extends through the first and second layers to form the blank.

2. The method of claim 1, wherein the lower press plunger is movable and assists in the pressing of the first layer, the second layer, or both.

3. The method of claim 1, wherein at least a portion of the first and second upper press plungers are in contact with the movable pin to maintain the through-hole extending through the first and second layers.

4. The method of claim 1, wherein the movable pin is generally cylindrically shaped with a tapered free end that contacts a lower end portion of the first upper press plunger or the second upper press plunger during the respective pressing step to assist in maintaining the through-hole through the respective first layer or first and second layers.

5. The method of claim 1, wherein an upper end portion of the movable pin remains in contact with the first upper press plunger or the second upper press plunger during the respective pressing step to assist in maintaining the through-hole through each layer.

6. The method of claim 1, wherein the second upper press plunger includes a lower portion that is pressed into at least a portion of the second ceramic material to define at least a portion of the second open cavity, and wherein the lower portion of the second upper press plunger includes an upper seat portion that has a shape, which imparts an anti-rotation feature along a surface of the through-hole of the blank.

7. The method of claim 6, wherein an upper end portion of the movable pin has a corresponding shape with a distal end of the lower portion of the second upper press plunger, which are in communication with one another during the pressing step to assist in maintaining the through-hole extending through the first and second layers.

8. The method of claim 1, wherein the second upper press plunger includes a lower portion that is pressed into at least a portion of the second ceramic material to define at least a portion of the second open cavity, and wherein the lower portion of the second upper press plunger has a shape that imparts an upper conical portion and a lower cylindrical end portion along a surface of the through-hole of the blank.

9. The method of claim 8, wherein the upper conical portion of the through-hole of the blank defines a seat portion for receiving an attachment device for securing a restoration formed from the blank to an abutment and wherein the seat portion includes an anti-rotation feature for preventing rotation of the attachment device.

10. The method of claim 8, wherein an upper portion of the movable pin has a corresponding shape with the lower cylindrical portion to assist in maintaining the through-hole extending through the first and second layers.

11. The method of claim 1, further comprising the step of partially or fully sintering the blank.

12. The method of claim 1, further comprising the steps of:
- extending the movable pin into the second open cavity;
- filling into the mold a third ceramic material of a different composition than the second ceramic material, wherein the third ceramic material is filled in a pourable condition into the second open cavity and around the movable pin to form a third layer while maintaining the through-hole in the first, second, and third layers; and
- pressing a third upper press plunger against the third layer so that a third open cavity is formed in communication with the through-hole that extends through the first, second, and third layers to form the blank;
- wherein the third upper press plunger includes a lower portion that is pressed into at least a portion of the third ceramic material to define at least a portion of the third open cavity, and wherein the lower portion of the third upper press plunger in communication with the movable pin imparts a shape to the through-hole of the blank that generally defines an upper conical portion and a lower cylindrical end portion.

13. The method of claim 12, wherein the upper conical portion of the through-hole of the blank defines a seat portion for receiving an attachment device for securing a restoration formed from the blank to an abutment and wherein the seat portion includes an anti-rotation feature for preventing rotation of the attachment device.

14. A method for forming a multi-layer blank of a ceramic material comprising the steps of:
- providing a mold that includes at least one side wall surrounding a lower press plunger to form a cavity therebetween, wherein the lower press plunger has a movable pin;
- extending the movable pin from an upper surface of the lower press plunger and into the cavity;
- filling into the mold a first ceramic material, wherein the first ceramic material is filled in a pourable condition into the mold and around the movable pin to form a first layer with a through-hole;
- pressing a first upper press plunger against the first layer so that a first open cavity is formed while at least a portion of the first upper press plunger is in contact with the movable pin to maintain the through-hole in the first layer;
- extending the movable pin into the first open cavity;
- filling into the mold a second ceramic material of different composition, wherein the second ceramic material is filled in a pourable condition into the first open cavity and around the movable pin to form a second layer while maintaining the through-hole in both the first and second layers; and
- pressing a second upper press plunger against the second layer so that a second open cavity is formed in communication with the through-hole that extends through the first and second layers, wherein the second open cavity and the through-hole define a screw-hole of the blank, the screw-hole having a generally cylindrical lower portion and an upper portion having a screw seat with an anti-rotation feature.

15. The method of claim 4, wherein the lower press plunger s movable ands assists in the pressing of the first layer, the second layer, or both.

16. The method of claim 14, further comprising the step of partially or fully sintering the blank.

17. A method for forming a multi-layer blank of a ceramic material comprising the steps of:
- providing a mold that includes at least one side wall surrounding a lower press plunger to form a cavity therebetween, wherein the lower press plunger has a movable pin;
- extending the movable pin from an upper surface of the lower press plunger and into the cavity;
- filling into the mold a first ceramic material, wherein the first ceramic material is filled in a pourable condition into the mold and around the movable pin to form a first layer with a through-hole;
- pressing a first upper press plunger against the first layer and an upper portion of the movable pin so that a first open cavity is formed while at least a portion of the first upper press plunger is in contact with the upper portion of the movable pin to maintain the through-hole in the first layer; wherein while the first ceramic material of the first layer is being compacted by the first upper press plunger, the movable pin is partially retracted into the lower press plunger by the pressing movement of the first upper press plunger;
- removing the first upper press plunger to expose at least a portion of the formed first open cavity;
- extending the movable pin into the first open cavity;
- filling into the mold a second ceramic material of different composition than the first ceramic material, wherein the second ceramic material is filled in a pourable condition into the first open cavity and around the movable pin to form a second layer while maintaining the through-hole in both the first and second layers; and
- pressing a second upper press plunger against the second layer and the upper portion of the movable pin so that a second open cavity is formed in communication with the through-hole that extends through the first and second layers to form the blank: wherein as the second upper press plunger presses against the second layer and the upper portion of the movable pin, the first and second ceramic materials are compressed while at least a portion of the movable pin is retracted into the lower press plunger by the pressing movement of the second upper press plunger.

18. The method of claim 17, wherein the second upper press plunger includes a lower portion that is pressed into at least a portion of the second ceramic material to define at least a portion of the second open cavity, and wherein the lower portion of the second upper press plunger in communication with the movable pin imparts a shape to the through-hole of the blank that generally defines an upper conical portion and a lower cylindrical end portion.

19. The method of claim 18, wherein the upper conical portion of the through-hole of the blank defines a seat portion for receiving an attachment device for securing a restoration formed from the blank to an abutment and wherein the seat portion includes an anti-rotation feature for preventing rotation of the attachment device.

20. The method of claim 19, further comprising the step of partially or fully sintering the blank.

* * * * *

UNITED STATES PATENT AND TRADEMARK OFFICE
CERTIFICATE OF CORRECTION

PATENT NO. : 12,251,277 B2  
APPLICATION NO. : 17/592677  
DATED : March 18, 2025  
INVENTOR(S) : Fecher et al.

Page 1 of 1

It is certified that error appears in the above-identified patent and that said Letters Patent is hereby corrected as shown below:

In the Claims

In Column 19, Line 60, in Claim 15, delete "claim 4," and insert --claim 14,-- therefor In Column 19, Line 61, in Claim 15, delete "s" and insert --is-- therefor In Column 19, Line 61, in Claim 15, delete "ands" and insert --and-- therefor Signed and Sealed this  
Ninth Day of September, 2025

Coke Morgan Stewart  
*Acting Director of the United States Patent and Trademark Office*